(12) United States Patent
Ishii et al.

(10) Patent No.: US 11,758,102 B2
(45) Date of Patent: Sep. 12, 2023

(54) DISPLAY DEVICE AND DISPLAY METHOD

(71) Applicant: Marelli Corporation, Saitama (JP)

(72) Inventors: Hirotomo Ishii, Saitama (JP); Norihiro Nagashima, Saitama (JP); Saori Koeda, Saitama (JP); Hirofumi Nishiyama, Saitama (JP)

(73) Assignee: Marelli Corporation, Saitama (JP)

( * ) Notice: Subject to any disclaimer, the term of this patent is extended or adjusted under 35 U.S.C. 154(b) by 146 days.

(21) Appl. No.: 17/619,574

(22) PCT Filed: Jul. 3, 2020

(86) PCT No.: PCT/JP2020/026256
§ 371 (c)(1),
(2) Date: Dec. 15, 2021

(87) PCT Pub. No.: WO2021/049141
PCT Pub. Date: Mar. 18, 2021

(65) Prior Publication Data
US 2022/0377299 A1 Nov. 24, 2022

(30) Foreign Application Priority Data
Sep. 13, 2019 (JP) .............................. 2019-167592

(51) Int. Cl.
*H04N 13/111* (2018.01)
*B60K 35/00* (2006.01)

(52) U.S. Cl.
CPC ............ *H04N 13/111* (2018.05); *B60K 35/00* (2013.01); *B60K 2370/1529* (2019.05);
(Continued)

(58) Field of Classification Search
CPC .......... H04N 13/111; B60K 2370/1529; B60K 2370/166; G01C 21/26; G01C 21/3635;
(Continued)

(56) References Cited

U.S. PATENT DOCUMENTS

| 6,507,784 B1 * | 1/2003 | Kuroda | G09B 29/10 |
| | | | 701/461 |
| 7,266,219 B2 * | 9/2007 | Okamoto | H04N 7/181 |
| | | | 348/E7.086 |

(Continued)

FOREIGN PATENT DOCUMENTS

| EP | 0378271 A1 | 7/1990 |
| EP | 3275716 A1 | 1/2018 |

(Continued)

OTHER PUBLICATIONS

Office Action of corresponding application JP 2019-167592, dated Dec. 17, 2019; 3 pages with translation.

(Continued)

*Primary Examiner* — Brian P Yenke
(74) *Attorney, Agent, or Firm* — Young Basile Hanlon & MacFarlane, P.C.

(57) ABSTRACT

A display device is mounted on a vehicle. The display device comprises a display unit and a control unit A virtual screen is a two-dimensional plane at a predetermined distance away from an origin of a XYZ coordinate system along a Y coordinate axis, and is approximately parallel to an XZ plane defined by an X coordinate axis and a Z coordinate axis. The control unit is configured to calculate coordinates of a second point obtained as a result of projecting a first point in the XYZ coordinate system onto the virtual screen, convert the calculated coordinates of the second point into coordinates according to a display mode of the display unit, and cause the display unit to display an image corresponding to the second point at the converted coordinates.

7 Claims, 17 Drawing Sheets

(52) U.S. Cl.
CPC .... *B60K 2370/166* (2019.05); *B60K 2370/52* (2019.05); *B60Y 2200/11* (2013.01)

(58) Field of Classification Search
CPC .......... B60R 2300/60; B60R 2300/607; G06T 15/10; G06T 15/20; G06T 7/536
See application file for complete search history.

(56) References Cited

U.S. PATENT DOCUMENTS

| | | | | |
|---|---|---|---|---|
| 7,375,728 | B2* | 5/2008 | Donath | B60R 1/00 |
| | | | | 348/118 |
| 7,630,833 | B2* | 12/2009 | Fukumoto | G01C 21/3638 |
| | | | | 340/995.14 |
| 10,436,600 | B2* | 10/2019 | Tayama | B60R 21/00 |
| 10,502,955 | B2* | 12/2019 | Kimura | G09G 3/001 |
| 10,852,818 | B2* | 12/2020 | Saisho | B60R 1/00 |
| 11,580,689 | B2* | 2/2023 | Tomaru | G06T 15/20 |
| 2002/0042674 | A1* | 4/2002 | Mochizuki | G01C 21/3635 |
| | | | | 701/455 |
| 2009/0201315 | A1 | 8/2009 | Nishida | |
| 2009/0244100 | A1* | 10/2009 | Schwegler | G09B 29/106 |
| | | | | 345/668 |
| 2019/0235241 | A1 | 8/2019 | Suzuki et al. | |
| 2019/0383631 | A1* | 12/2019 | Bigio | G06V 20/59 |
| 2020/0156657 | A1* | 5/2020 | Tanizawa | B60W 50/14 |
| 2021/0271079 | A1* | 9/2021 | Yoneda | G06V 20/56 |
| 2022/0078390 | A1* | 3/2022 | Jingu | H04N 13/117 |
| 2022/0080826 | A1* | 3/2022 | Shoji | G01C 21/26 |
| 2022/0116574 | A1* | 4/2022 | Kakimaru | H04N 13/111 |

FOREIGN PATENT DOCUMENTS

| | | |
|---|---|---|
| JP | H02244188 A | 9/1990 |
| JP | 2000211452 A | 8/2000 |
| JP | 2004217188 A | 8/2004 |
| JP | 2016158188 A | 9/2016 |
| JP | 2016182891 A | 10/2016 |
| JP | 2018073036 A | 5/2018 |
| WO | 2007132576 A1 | 11/2007 |
| WO | 2018066695 A1 | 4/2018 |

OTHER PUBLICATIONS

International Preliminary Report on Patentability from corresponding application PCT/JP2020/026256; dated Mar. 15, 2022; 10 pages with translation.

* cited by examiner

SCHEMATIC DIAGRAM OF ROAD MARKINGS PROJECTED ONTO VIRTUAL SCREEN
(PLAIN VIEW)

SCHEMATIC DIAGRAM OF ROAD MARKINGS PROJECTED ONTO VIRTUAL SCREEN
(BIRD'S-EYE VIEW)

SCHEMATIC DIAGRAM OF ROAD DISPLAYED ON MIDDLE SCREEN
(PLAIN VIEW)

SCHEMATIC DIAGRAM OF ROAD DISPLAYED ON MIDDLE SCREEN
(BIRD'S-EYE VIEW)

SCHEMATIC DIAGRAM OF ROAD DISPLAYED ON MIDDLE SCREEN
(PLAIN VIEW)

SCHEMATIC DIAGRAM OF ROAD DISPLAYED ON MIDDLE SCREEN
(BIRD'S-EYE VIEW)

DISPLAY DEVICE AND DISPLAY METHOD

CROSS REFERENCE TO RELATED APPLICATION

This application claims priority to and the benefit of Japanese Patent Application No. 2019-167592 filed on Sep. 13, 2019, the entire disclosure of which is incorporated herein by reference.

TECHNICAL FIELD

The present disclosure relates to a display device and a display method.

BACKGROUND

Display devices mounted on vehicles are conventionally known. It is desirable to display map information of roads and the like on a display device in a perspective view so that a driver can easily grasp the information. For example, JP H02-244188 A discloses a display device that displays part of map information of roads and the like in a perspective view.

SUMMARY

In recent years, there is a need to display, on a display device of a vehicle, a lot of information such as the positions of objects around the vehicle in order to drive the vehicle more safely. It is also desirable to display objects on the display device in a perspective view so that the driver can easily grasp the information. However, displaying many objects on the display device in a perspective view may require complex processing by the display device.

It could therefore be helpful to provide a display device and a display method that can display objects in a perspective view more easily.

A display device according to a first aspect is a display device mounted on a vehicle and comprising a control unit and a display unit, wherein the control unit is configured to calculate coordinates of a second point obtained as a result of projecting a first point in a three-dimensional coordinate system onto a two-dimensional plane, convert the calculated coordinates of the second point into coordinates according to a display mode of the display unit, and cause the display unit to display an image corresponding to the second point at the converted coordinates, the three-dimensional coordinate system is a three-dimensional coordinate system relative to the vehicle, and is defined by an X coordinate axis approximately parallel to a width direction of the vehicle, a Y coordinate axis approximately parallel to a direction from rear to front of the vehicle, and a Z coordinate axis approximately parallel to a height direction of the vehicle, the two-dimensional plane is at a predetermined distance away from an origin of the three-dimensional coordinate system along the Y coordinate axis, and is approximately parallel to an XZ plane defined by the X coordinate axis and the Z coordinate axis, and the control unit is configured to: calculate the coordinates of the second point obtained as a result of projecting the first point in the three-dimensional coordinate system onto the two-dimensional plane, by the following Formula (1):

$$Xc=(L/Y)\times X$$

$$Zc=(L/Y)\times Z \qquad \text{Formula (1)},$$

where the predetermined distance is L, coordinates of the first point in the three-dimensional coordinate system are (X, Y, Z), and the coordinates of the second point on the two-dimensional plane are (Xc, Zc); and convert the calculated coordinates of the second point into the coordinates according to the display unit, by the following Formula (2):

$$Xs=Xc\times(C1/ZA)+C2$$

$$Ys=Zc\times(C1/ZA)+C1 \qquad \text{Formula (2)},$$

where a coordinate system of the display unit is an XsYs coordinate system, a Z coordinate of the vehicle in the three-dimensional coordinate system is ZA, and the display mode of the display unit varies depending on a constant C1 and a constant C2.

A display method according to a second aspect is a display method in a display device mounted on a vehicle, the display method comprising a step of calculating coordinates of a second point obtained as a result of projecting a first point in a three-dimensional coordinate system onto a two-dimensional plane, converting the calculated coordinates of the second point into coordinates according to a display mode of the display device, and displaying an image corresponding to the second point at the converted coordinates, wherein the three-dimensional coordinate system is a three-dimensional coordinate system relative to the vehicle, and is defined by an X coordinate axis approximately parallel to a width direction of the vehicle, a Y coordinate axis approximately parallel to a direction from rear to front of the vehicle, and a Z coordinate axis approximately parallel to a height direction of the vehicle, the two-dimensional plane is at a predetermined distance away from an origin of the three-dimensional coordinate system along the Y coordinate axis, and is approximately parallel to an XZ plane defined by the X coordinate axis and the Z coordinate axis, and the step includes: a step of calculating the coordinates of the second point obtained as a result of projecting the first point in the three-dimensional coordinate system onto the two-dimensional plane, by the following Formula (1):

$$Xc=(L/Y)\times X$$

$$Zc=(L/Y)\times Z \qquad \text{Formula (1)},$$

where the predetermined distance is L, coordinates of the first point in the three-dimensional coordinate system are (X, Y, Z), and the coordinates of the second point on the two-dimensional plane are (Xc, Zc); and a step of converting the calculated coordinates of the second point into the coordinates according to a display unit in the display device, by the following Formula (2):

$$Xs=Xc\times(C1/ZA)+C2$$

$$Ys=Zc\times(C1/ZA)+C1 \qquad \text{Formula (2)},$$

where a coordinate system of the display unit is an XsYs coordinate system, a Z coordinate of the vehicle in the three-dimensional coordinate system is ZA, and the display mode of the display unit varies depending on a constant C1 and a constant C2.

A display device and a display method according to one of the disclosed embodiments can display objects in a perspective view more easily.

DETAILED DESCRIPTION

Figure 1:
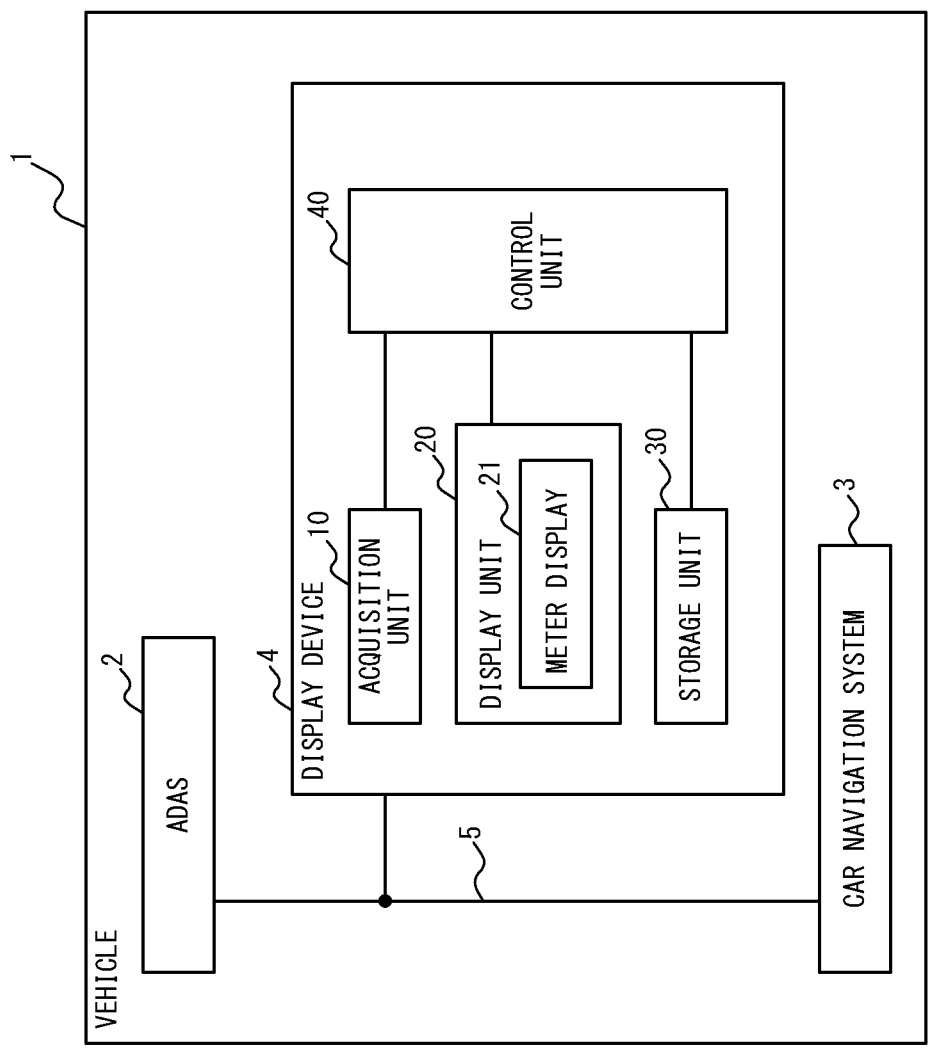
FIG. 1 is a block diagram illustrating an example of the structure of a vehicle according to one of the disclosed embodiments.

One of the disclosed embodiments will be described below, with reference to the drawings. The drawings used in the following description are schematic, and the dimensional ratios and the like in the drawings do not necessarily correspond to the actual dimensional ratios and the like.

Figure 2:
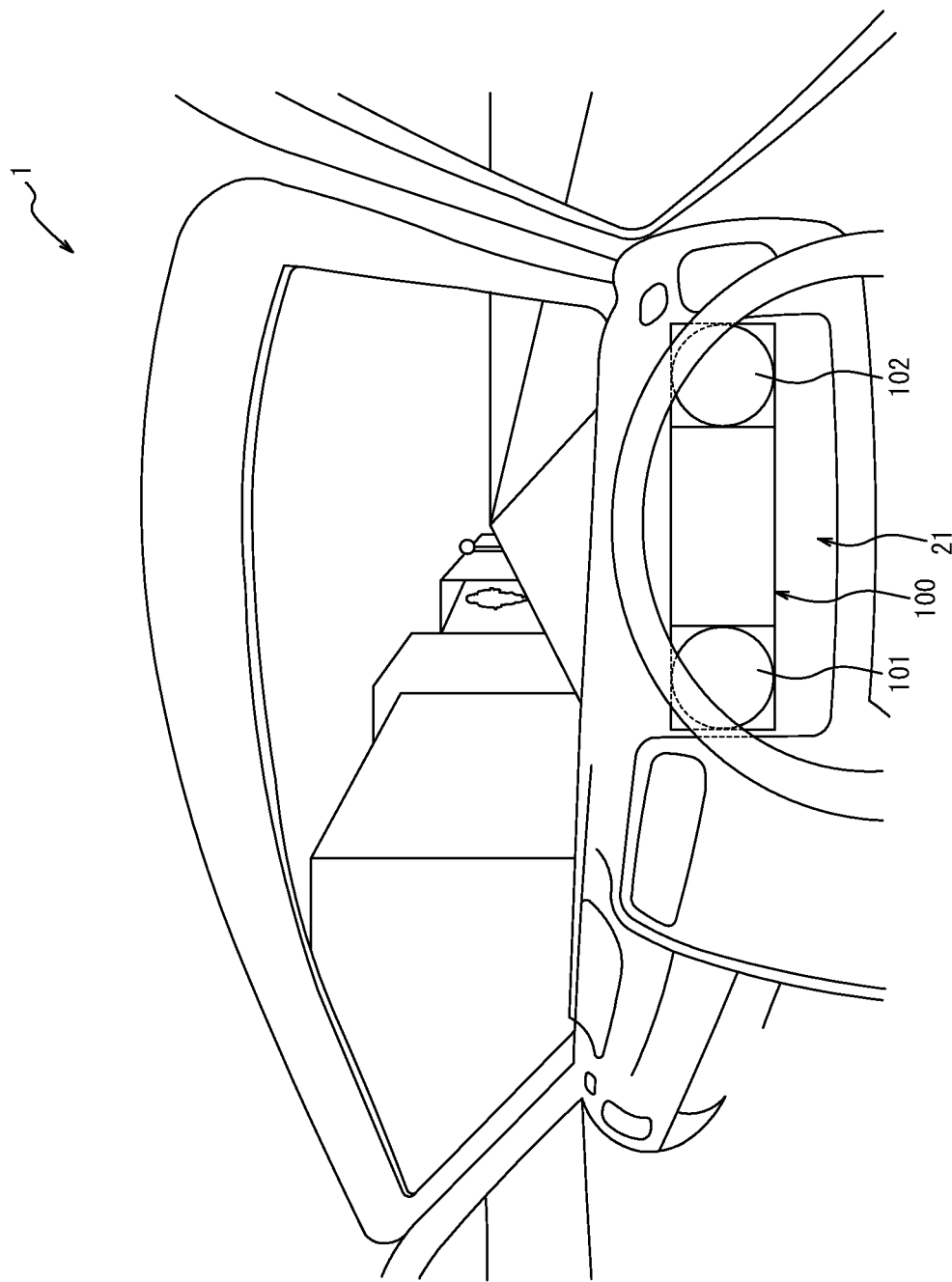
FIG. 2 is a diagram illustrating an example of the position of a meter display illustrated in FIG. 1.

FIG. 1 is a block diagram illustrating an example of the structure of a vehicle 1 according to one of the disclosed embodiments. FIG. 2 is a diagram illustrating an example of the position of a meter display 21 illustrated in FIG. 1.

As illustrated in FIG. 1, the vehicle 1 includes advanced driver assistance systems (ADAS) 2, a car navigation system 3, and a display device 4. In addition to these components, the vehicle 1 may include a motor such as an engine, an electronic control unit (ECU), and the like. The components in the vehicle 1 are capable of communicating with each other via a communication bus 5 provided in the vehicle 1. The communication bus 5 may use a communication scheme based on Controller Area Network (CAN) or the like.

The ADAS 2 assist a driver in driving the vehicle 1. The ADAS 2 are capable of detecting information of objects around the vehicle 1 and information of the surrounding environment of the vehicle 1. Examples of the objects around the vehicle 1 include other vehicles, pedestrians, and flying objects. The information of each object around the vehicle 1 may include at least one selected from the type of the object (vehicle type in the case where the object is another vehicle) and position information of the object relative to the vehicle 1. The position information of the object relative to the vehicle 1 may include at least one selected from the below-described xPosition and yPosition corresponding to the object, the below-described xStep corresponding to the object, and the below-described curvature radius corresponding to the object.

The information of the surrounding environment of the vehicle 1 may include at least one selected from inter-vehicular distance, road condition information, traffic light condition, speed limit, region type (city or suburb), and sign information. The road condition information may include at least one selected from road surface state, driving lane state, road type (expressway, arterial road, or ordinary road), and the number of lanes. The road condition information may include at least one selected from road curvature radius, road marking type, road marking color, interval of lane marks forming each road marking, and information of the below-described xStep corresponding to the road marking. Examples of road marking types include a road edge marking for separation between a side strip and a road, a center marking, and a traffic lane marking in a three-lane road or the like.

The ADAS 2 may include at least one selected from sensors for detecting the information of each object around the vehicle 1 and sensors for detecting the environmental information of the surrounding environment of the vehicle 1. The ADAS 2 may include at least one selected from sensors constituting a traffic-sign recognition system and sensors constituting adaptive cruise control (ACC). For example, the ADAS 2 may include at least one selected from a camera, LiDAR (Light Detection And Ranging), millimeter-wave radar, a GPS (Global Positioning System) signal receiver, and an inertial measurement unit (IMU).

The car navigation system 3 performs, for example, route guidance to a destination for the driver. The car navigation system 3 may include at least one selected from a GPS signal receiver and a wireless communication module. The car navigation system 3 may acquire position information of the vehicle 1 by a GPS signal receiver or the like. The car navigation system 3 may acquire map information from a device (for example, server device) outside the vehicle 1 by a wireless communication module based on a long-range wireless communication standard. The map information may include at least one selected from information of route guidance to destinations and traffic congestion information. The car navigation system 3 may present the map information and the position information of the vehicle 1 to the driver.

The car navigation system 3 may receive input from a user. The input from the user may include input to the display device 4 described below.

The display device 4 is mounted on the vehicle 1. The display device 4 includes an acquisition unit 10, a display unit 20, a storage unit 30, and a control unit 40.

The acquisition unit 10 acquires various information from other components in the vehicle 1 via the communication bus 5 and/or from devices outside the vehicle 1. Examples of the devices outside the vehicle 1 include vehicles around the vehicle 1 and roadside units. The acquisition unit 10 may include at least one selected from a communication module for vehicle-to-vehicle (V2V) communication and a communication module for road-to-vehicle communication (vehicle-to-X (V2X)), in order to communicate with vehicles around the vehicle 1, roadside units, and the like. The acquisition unit 10 outputs the acquired information to the control unit 40. The information acquired by the acquisition unit 10 may be, for example, stored in the storage unit 30 by the control unit 40.

The acquisition unit 10 may acquire the above-described information of each object around the vehicle 1 and information of the surrounding environment of the vehicle 1 from the ADAS 2 via the communication bus 5. The acquisition unit 10 may acquire the above-described position information of the vehicle 1 and map information from the car navigation system 3 via the communication bus 5. The acquisition unit 10 may receive input from the user to the display device 4, from the car navigation system 3 via the communication bus 5. Examples of the input from the user to the display device 4 include input for switching the display mode of the display unit 20 to a plain view and input for switching the display mode of the display unit 20 to a bird's-eye view.

The acquisition unit 10 may acquire information about the conditions of the vehicle 1, from other components in the vehicle 1 via the communication bus 5. The information about the conditions of the vehicle 1 may include at least one selected from target speed, current vehicle speed, engine speed, accelerator state, brake state, clutch state, winker state, gear state, wiper state, door mirror state, seat state, audio state, warning state, light state, steering state, idle state, air conditioner state, seatbelt state, fuel state, water temperature state, and driving operation level.

The display unit 20 includes the meter display 21. The display unit 20 may include any display. For example, the display unit 20 may include a head-up display (HUD) or a center display.

The meter display 21 is located in the instrument panel of the vehicle 1, as illustrated in FIG. 2. The meter display 21 may be located near the back side of the steering wheel. The meter display 21 may include a thin film transistor (TFT) liquid crystal display or the like. The meter display 21 displays various information based on control by the control unit 40. The meter display 21 may be a touch panel display, or a display that cannot be touch-operated. In the case where the meter display 21 is a touch panel display, the meter display 21 may receive, from the user, input for switching the display mode of the display unit 20 to a plain view and input for switching the display mode of the display unit 20 to a bird's-eye view.

The meter display 21 displays a display screen 100 based on control by the control unit 40. The screen displayed by the meter display 21 is, however, not limited to the display screen 100. For example, the meter display 21 may display a tachometer screen 101 and a speedometer screen 102, as illustrated in FIG. 2.

Figure 3:
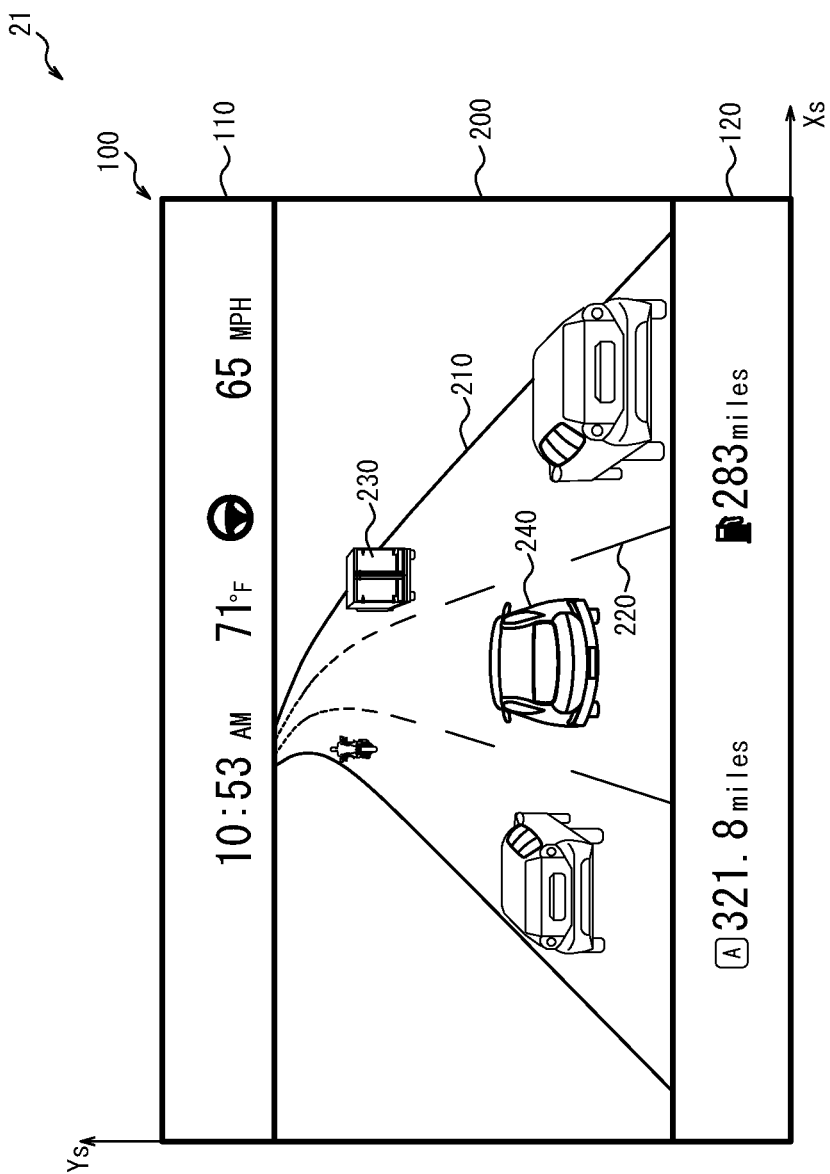
FIG. 3 is a diagram illustrating an example of the display screen of the meter display illustrated in FIG. 1.

FIG. 3 illustrates the display screen 100 of the meter display 21 illustrated in FIG. 1. The display screen 100 may be rectangular. The XsYs coordinate system of the display screen 100 is a two-dimensional coordinate system defined by an Xs coordinate axis and a Ys coordinate axis. The Xs coordinate axis can correspond to the width direction of the vehicle 1. When the vehicle 1 is running on a road, the Xs coordinate axis can correspond to the width direction of the road. The Ys coordinate axis is orthogonal to the Xs coordinate axis.

The below-described information is displayed on the display screen 100. The information displayed on the display screen 100 is, however, not limited to such, and any information may be displayed on the display screen 100. For example, POI information may be displayed on the display screen 100.

The display screen 100 includes an upper screen 110, a lower screen 120, and a middle screen 200. The upper screen 110 is located in an upper part of the display screen 100. The lower screen 120 is located in a lower part of the display screen 100. The middle screen 200 is located between the upper screen 110 and the lower screen 120.

The upper screen 110 and the lower screen 120 may each be rectangular. Information about the conditions of the vehicle 1 is displayed on the upper screen 110 and the lower screen 120 in a simplified form. For example, the current time, a warning light indicating an abnormality in the power steering, the current speed of the vehicle 1, and the like are displayed on the upper screen 110. For example, the running distance of the vehicle 1, a warning light for warning of the remaining amount of gasoline, and the like are displayed on the lower screen 120.

Information of the surroundings of the vehicle 1 is displayed on the middle screen 200 in perspective. For example, an image 210 of a road edge marking, an image 220 of a lane marking, and an image 230 of another vehicle are displayed on the middle screen 200 in perspective. An image 240 of the vehicle 1 is also displayed on the middle screen 200 so that the driver can easily grasp the positional relationship between the vehicle 1 and the other vehicle.

The storage unit 30 stores information acquired from the control unit 40. The storage unit 30 may function as working memory of the control unit 40. The storage unit 30 may store programs executed by the control unit 40. The storage unit 30 may be composed of semiconductor memory. The storage unit 30 is not limited to semiconductor memory, and may be composed of a magnetic storage medium or any other storage medium. The storage unit 30 may be included in the control unit 40 as part of the control unit 40.

The storage unit 30 stores a difference r associated with the below-described xStep. The storage unit 30 stores images of objects displayed on the middle screen 200. For example, the storage unit 30 stores images of lane marks and images of vehicles of different vehicle types. The storage unit 30 stores images corresponding to inclinations of objects. For example, the storage unit 30 stores images corresponding to inclinations of lane marks, vehicles, and the like.

The control unit 40 controls each component in the display device 4. The control unit 40 may be, for example, composed of a processor such as a central processing unit (CPU) for executing programs defining control procedures. For example, the control unit 40 reads the programs stored in the storage unit 30 and executes the programs.

The control unit 40 acquires information about the conditions of the vehicle 1 from other components in the vehicle 1, by the acquisition unit 10. The control unit 40 generates information displayed on the upper screen 110 and the lower screen 120 illustrated in FIG. 3, based on the acquired information about the conditions of the vehicle 1. The control unit 40 outputs the generated information to the meter display 21. As a result of the control unit 40 outputting the generated information to the meter display 21, the upper screen 110 and the lower screen 120 are displayed on the meter display 21 as illustrated in FIG. 3.

The control unit 40 acquires information of each object around the vehicle 1 and information of the surrounding environment of the vehicle 1 from the ADAS 2, by the acquisition unit 10. The control unit 40 generates information displayed on the middle screen 200 illustrated in FIG. 3, based on the acquired information. For example, the control unit 40 generates information for displaying the images 210 to 240 on the middle screen 200 as illustrated in FIG. 3. The control unit 40 displays the images 210 to 240 on the middle screen 200 in perspective. As a result of the control unit 40 displaying the images 210 to 240 in perspective, the driver can grasp the positional relationship between the vehicle 1 and the other vehicle more easily.

The control unit 40 can acquire position information of each object around the vehicle 1, as coordinates of a three-dimensional coordinate system relative to the vehicle 1. The control unit 40 can display information of each object around the vehicle 1 on the middle screen 200 by, for example, converting the acquired coordinates of the three-dimensional coordinate system into the XsYs coordinate system of the display screen 100. This process will be described briefly below.

Figure 4:
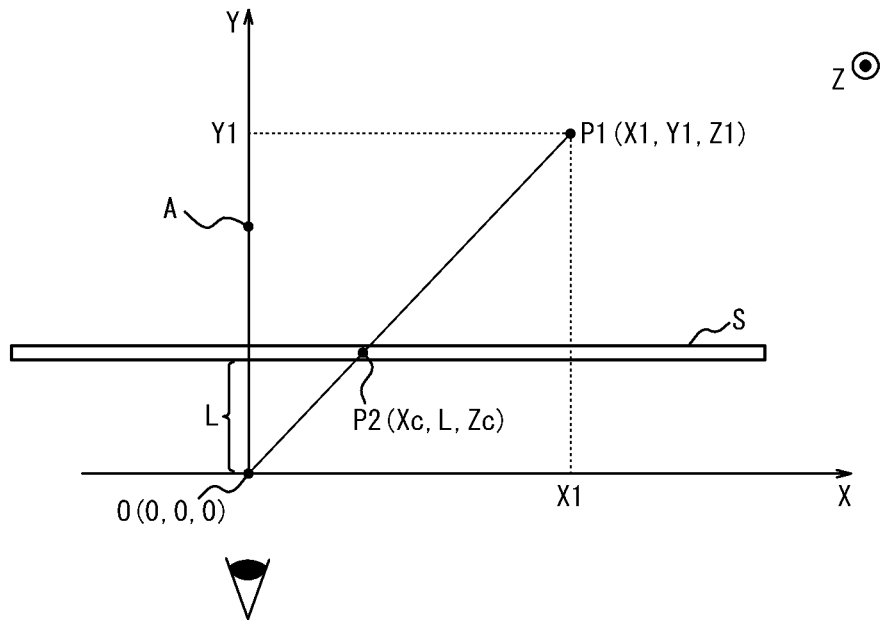
FIG. 4 is a diagram illustrating the correspondence between a three-dimensional coordinate system and a virtual screen (first diagram)
Figure 5:
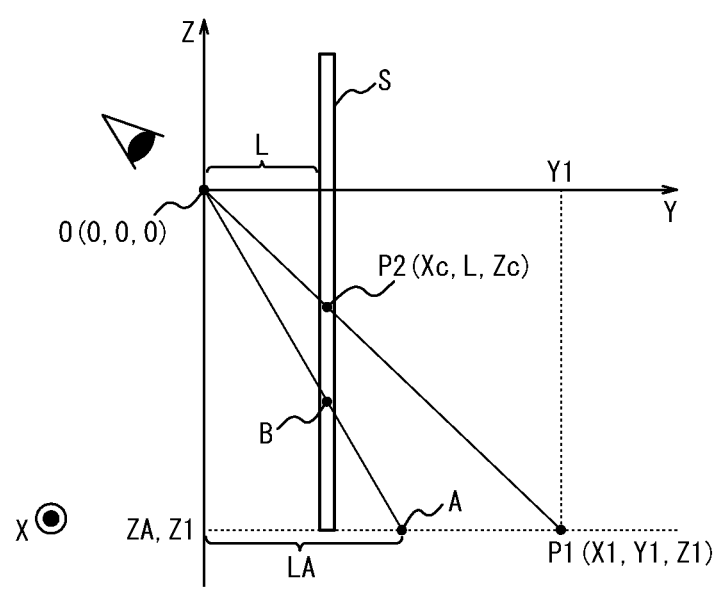
FIG. 5 is a diagram illustrating the correspondence between the three-dimensional coordinate system and the virtual screen (second diagram)

FIG. 4 is a diagram illustrating the correspondence between a three-dimensional coordinate system and a virtual screen (first diagram). FIG. 5 is a diagram illustrating the correspondence between the three-dimensional coordinate system and the virtual screen (second diagram). Hereafter, an XYZ coordinate system is used as the three-dimensional coordinate system, as illustrated in FIG. 4 and FIG. 5.

The XYZ coordinate system is a three-dimensional coordinate system relative to the vehicle 1. The XYZ coordinate system is defined by an X coordinate axis, a Y coordinate axis, and a Z coordinate axis. A plane defined by the X coordinate axis and the Y coordinate axis is also referred to as "XY plane". A plane defined by the X coordinate axis and the Z coordinate axis is also referred to as "XZ plane". A plane defined by the Y coordinate axis and the Z coordinate axis is also referred to as "YZ plane".

The X coordinate axis is approximately parallel to the width direction of the vehicle 1. When the vehicle 1 is running on a road, the X coordinate axis can be approximately parallel to the width direction of the road. The Y coordinate axis is approximately parallel to a direction from the rear to front of the vehicle 1. When the vehicle 1 is running, the Y coordinate axis can be approximately parallel to the traveling direction of the vehicle 1. The Z coordinate axis is approximately parallel to the height direction of the vehicle 1.

A virtual screen S is a two-dimensional plane. The virtual screen S is at a predetermined distance L away from the origin O of the three-dimensional coordinate system along the Y coordinate axis. The virtual screen S is approximately parallel to the XZ plane. On the virtual screen S, the Y coordinate of any point in the XYZ coordinate system is a coordinate (L). The virtual screen S corresponds to the middle screen 200.

A first point P1 indicates the position of an object. It is assumed here that the first point P1 indicates the position of another vehicle. The XYZ coordinates of the first point P1 are XYZ coordinates (X1, Y1, Z1). A point A indicates the position of the vehicle 1. In the structure illustrated in FIG. 4 and FIG. 5, the other vehicle corresponding to the first point P1 and the vehicle 1 corresponding to the point A are located on a flat road. When the first point P1 and the point A are located on a flat road, the Z coordinate (ZA) of the point A can be equal to the Z coordinate (Z1) of the first point P1. The Z coordinate (ZA) of the point A corresponds to the height from the point A, i.e. the position of the vehicle 1, to the origin O of the XYZ coordinate system.

A second point P2 is a point at which the first point P1 is projected onto the virtual screen S when the first point P1 is viewed from the origin O of the XYZ coordinate system. A point B illustrated in FIG. 5 is a point at which the point A is projected onto the virtual screen S when the point A is viewed from the origin O of the XYZ coordinate system.

The control unit 40 can acquire the XYZ coordinates (X1, Y1 Z1) of the first point P1. A process of acquiring the first point P1 will be described later. The control unit 40 calculates the XYZ coordinates (Xc, L, Zc) of the second point P2, based on the acquired XYZ coordinates (X1, Y1 Z1) of the first point P1. On the virtual screen S, the Y coordinate of any point in the XYZ coordinate system is the coordinate (L), as mentioned above. Hence, the control unit 40 only needs to calculate the X coordinate (Xc) and Z coordinate (Zc) of the second point P2. For example, the control unit 40 calculates the XZ coordinates (Xc, Zc) of the second point P2 by substituting (X1 Y1 Z1) into (X, Y, Z) in Formula (1):

$Xc=(L/Y) \times X$ $Zc=(L/Y) \times Z$ Formula (1).

On a flat road, the Z coordinate of an object located on the road is equal to the Z coordinate (ZA) of the point A. In this case, Formula (1) can be replaced by Formula (1-1):

$Xc=(L/Y) \times X$ $Zc=(L/Y) \times ZA$ Formula (1-1).

The control unit 40 converts the calculated XZ coordinates (Xc, Zc) of the second point P2 into the XsYs coordinates on the display screen 100. Here, the control unit 40 converts the XZ coordinates (Xc, Zc) of the second point P2 into the XsYs coordinates according to the display mode of the middle screen 200. For example, the control unit 40 converts the XZ coordinates (Xc, Zc) of the second point P2 into the XsYs coordinates by Formula (2):

$Xs=Xc \times (C1/ZA)+C2$ $Ys=Zc \times (C1/ZA)+C1$ Formula (2).

In Formula (2), the constants C1 and C2 correspond to the XsYs coordinates (C2, C1) of a vanishing point on the display screen 100. The control unit 40 displays an image corresponding to the second point P2 (for example, the image 230 illustrated in FIG. 3), at the XsYs coordinates of the second point P2 on the middle screen 200. By adjusting the XsYs coordinates (C2, C1) of the vanishing point, i.e. the constants C1 and C2, as appropriate, the display mode of the middle screen 200, such as a plain view, can be adjusted as appropriate. In other words, the display mode of the middle screen 200 varies depending on the constants C1 and C2. In Formula (2), the term (C1/ZA) is also called a scaling component, and the terms C1 and C2 are each also called a horizontal displacement component. As an example, the control unit 40 may acquire, from the user, input for switching the display mode of the display unit 20 to a plain view or input for switching the display mode of the display unit 20 to a bird's-eye view, by the acquisition unit 10. By substituting the constants C1 and C2 according to the acquired input into Formula (2) as appropriate, the control unit 40 can switch the display mode of the display unit 20 to a plain view or a bird's-eye view as appropriate.

In Formula (1-1) and Formula (2), the Z coordinate (ZA) corresponds to the height from the point A, i.e. the position of the vehicle 1, to the origin O of the XYZ coordinate system, as mentioned above. The origin O of the XYZ coordinate system can be the viewpoint when the driver views the vehicle 1 corresponding to the point A and the other vehicle corresponding to the first point P1 through the virtual screen S. By adjusting the height from the position of the vehicle 1 to the origin O of the XYZ coordinate system, i.e. the Z coordinate (ZA) in Formula (1) and Formula (2), as appropriate, the display mode of the middle screen 200 can be adjusted as appropriate. For example, the driver's viewpoint can be higher when the height from the point A, i.e. the position of the vehicle 1, to the origin O of the XYZ coordinate system is higher. That is, the display mode of the display unit 20 can be a bird's-eye view when the height from the point A, i.e. the position of the vehicle 1, to the origin O of the XYZ coordinate system is high. The driver's viewpoint can be lower when the height from the point A, i.e. the position of the vehicle 1, to the origin O of the XYZ coordinate system is lower. That is, the display mode of the display unit 20 can be a plain view when the height from the point A, i.e. the position of the vehicle 1, to the origin O of the XYZ coordinate system is low. As an example, the control unit 40 may adjust the Z coordinate (ZA) as appropriate according to the input from the user for switching the display mode of the display unit 20 to a plain view or the input from the user for switching the display mode of the display unit 20 to a bird's-eye view, which is acquired by the acquisition unit 10.

The origin O of the XYZ coordinate system may be set at a position behind the vehicle 1. Moreover, the origin O of the XYZ coordinate system may be set at a position away from the vehicle 1. With such a structure, the virtual screen S can contain the point B corresponding to the vehicle 1. That is, the image 240 corresponding to the vehicle 1 can be displayed on the middle screen 200, as illustrated in FIG. 3.

The XYZ coordinate system is a three-dimensional coordinate system relative to the vehicle 1, as mentioned above. Accordingly, the positional relationship between the origin O of the XYZ coordinate system and the point A indicating the vehicle 1 can be fixed uniquely. Therefore, the distance between the origin O and the point A in the Y coordinate axis can be fixed uniquely. The distance between the origin O and the point A in the Y coordinate axis is referred to as "distance LA".

The control unit 40 acquires information from the ADAS 2 via the communication bus 5, by the acquisition unit 10. That is, the control unit 40 acquires information according to the communication scheme of the communication bus 5. The information according to the communication scheme of the communication bus 5 is information according to the display mode of the display unit 20, i.e. information adapted to perspective, in some cases. If the control unit 40 directly displays such information adapted to perspective on the middle screen 200 in the display unit 20, the computational load of the control unit 40 may increase.

Hence, the control unit 40 temporarily converts part of the position information of each object relative to the vehicle 1 acquired from the ADAS 2, into the XYZ coordinate system. The control unit 40 further converts the information temporarily converted into the XYZ coordinate system, into the XsYs coordinate system of the middle screen 200. The control unit 40 then displays the resultant information on the middle screen 200 in the display unit 20. With such a structure, the computational load of the control unit 40 can be reduced as compared with the case where the information acquired from the ADAS 2 is directly displayed on the middle screen 200. This process will be described in detail below. An example of the information which the control unit 40 acquires from the ADAS 2 will be described first.

Figure 6:
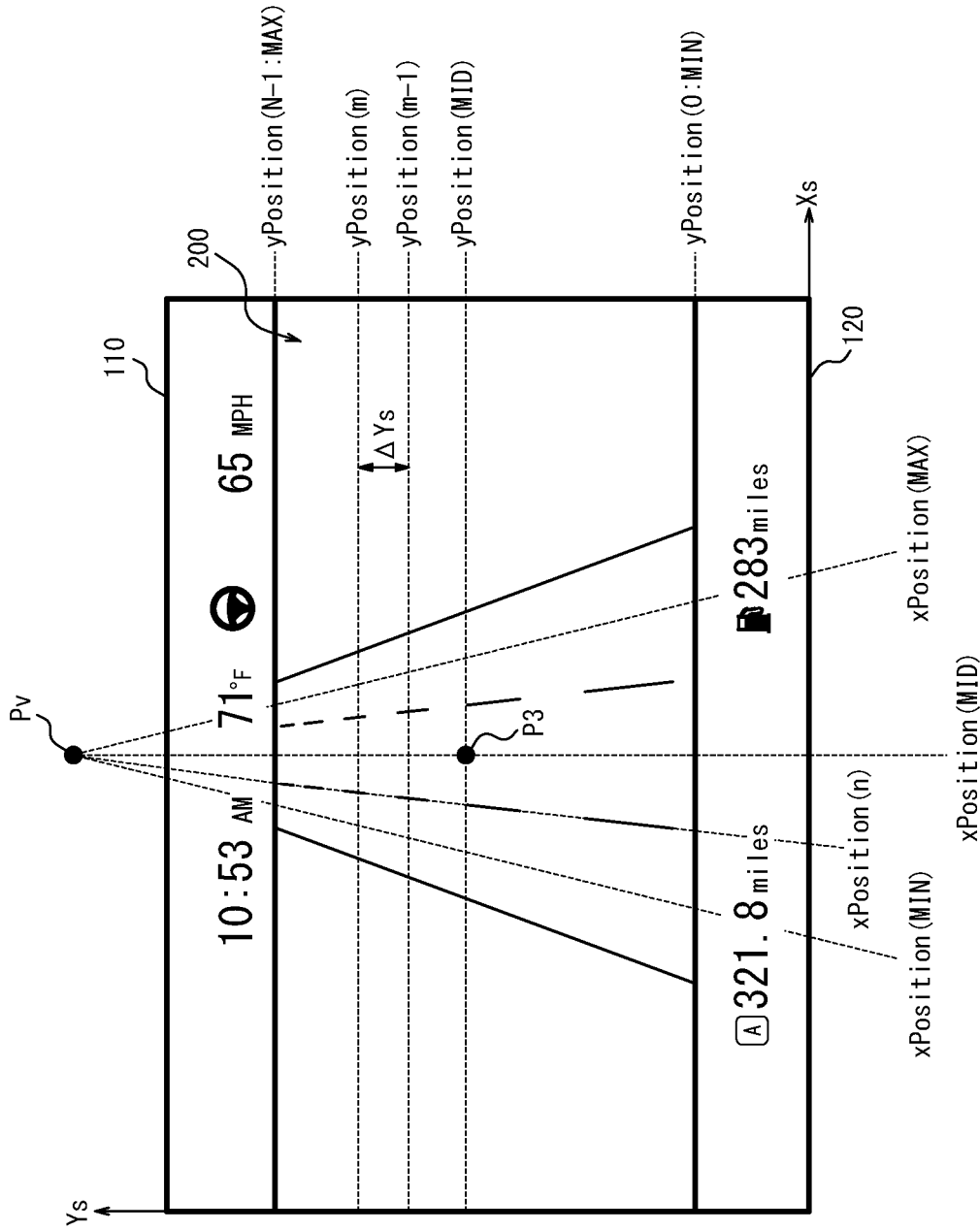
FIG. 6 is a diagram explaining the correspondence between each of xPosition and yPosition and an XsYs coordinate system.

FIG. 6 is a diagram explaining the correspondence between each of xPosition and yPosition and the XsYs coordinate system. A vanishing point Pv is the position of a vanishing point corresponding to the XsYs coordinate system. A point P3 indicates the position of the vehicle 1.

xPosition and yPosition are information generated by the ADAS 2. xPosition and yPosition can be transmitted from the ADAS 2 to the display device 4.

xPosition is used to represent the position of an object present on the right or left side relative to the vehicle 1. The range of xPosition is from xPosition(MIN) to xPosition(MAX). The middle of the range of xPosition is xPosition(MID). As an example, the range of xPosition may be from xPosition(0) to xPosition(120). In this case, xPosition(MID) can be xPosition(60).

xPosition(MIN) represents the position of an object present leftmost relative to the vehicle 1. In the case where the vehicle 1 is running on the middle lane of a three-lane road, xPosition(MIN) can correspond to the center of the left lane of the three-lane road.

xPosition(MID) represents the position of an object present at the same position as the vehicle 1 in the right-left direction of the vehicle 1. xPosition(MID) can correspond to the position of the vehicle 1. In other words, the point P3 indicating the position of the vehicle 1 is located on xPosition(MID). In the case where the vehicle 1 is running on the middle lane of a three-lane road, xPosition(MID) can correspond to the center of the middle lane of the three-lane road.

xPosition(MAX) represents the position of an object present rightmost relative to the vehicle 1. In the case where the vehicle 1 is running on the middle lane of a three-lane road, xPosition(MAX) can correspond to the center of the right lane of the three-lane road.

xPosition(n) is the nth (n: an integer of 0 or more) xPosition from xPosition(MIN) in the positive direction of the Xs coordinate axis.

yPosition is used to represent the position of an object present on the front or rear side relative to the vehicle 1. The range of yPosition is from yPosition(MIN) to yPosition(MAX). The middle of the range of yPosition is yPosition(MID). yPosition(m) is the mth (m: an integer of 0 or more) yPosition from yPosition(MIN) in the positive direction of the Ys coordinate axis.

The pitch width of yPosition is width ΔYs. The width ΔYs is given by dividing the middle screen 200 by N (N: an integer of 0 or more) along the Ys coordinate axis. In this case, yPosition(MIN) can be yPosition(0), and yPosition(MAX) can be yPosition(N−1). As an example, N may be 256. In the case where N is 256, yPosition(N−1) is yPosition(255). In the case where N is 256, yPosition(MID) is, for example, yPosition(119).

yPosition(MIN) can correspond to the boundary line between the lower screen 120 and the middle screen 200. yPosition(MAX) can correspond to the boundary line between the upper screen 110 and the middle screen 200. yPosition(MID) can correspond to the position of the vehicle 1. In other words, the point P3 indicating the position of the vehicle 1 is located on yPosition(MID).

Figure 7:
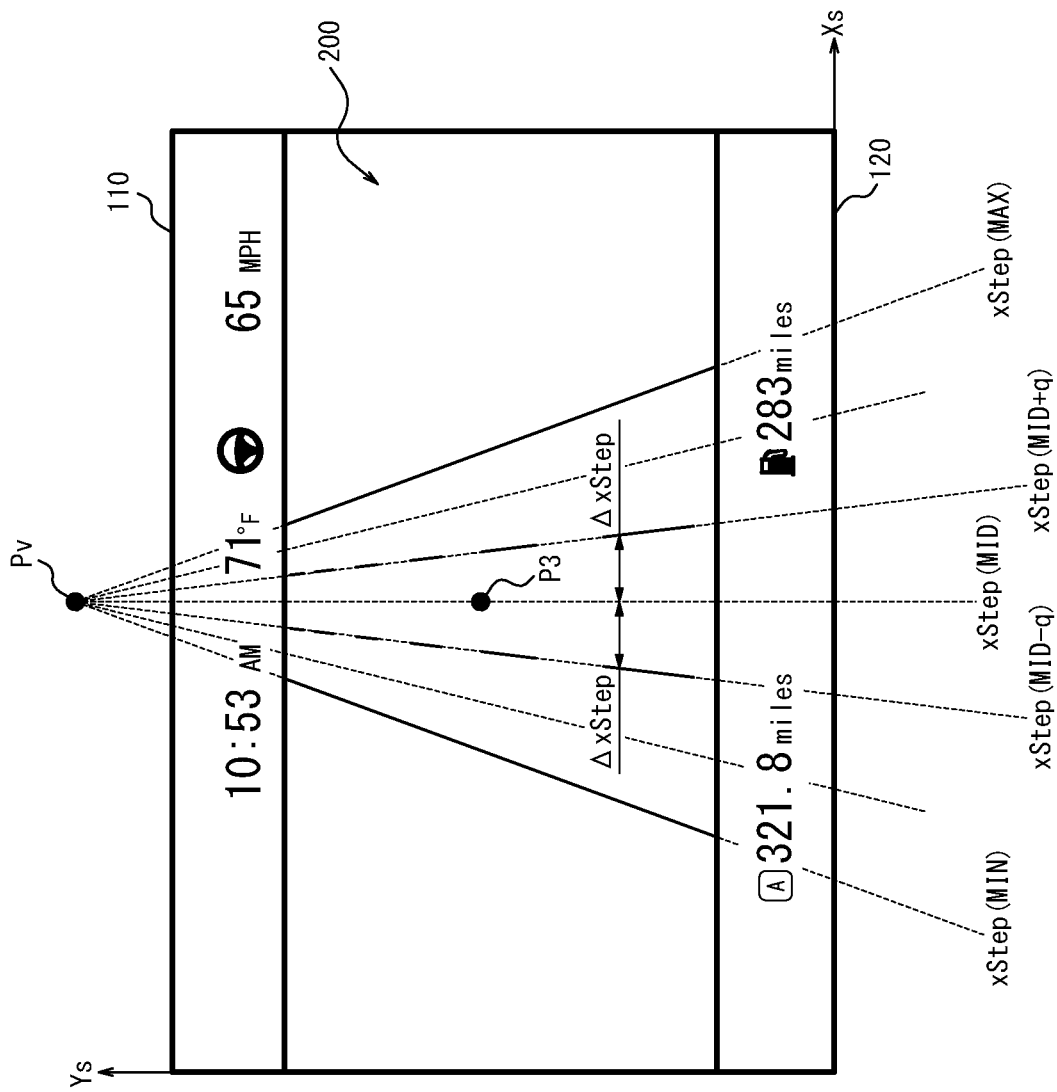
FIG. 7 is a diagram explaining the correspondence between xStep and the XsYs coordinate system.

FIG. 7 is a diagram explaining the correspondence between xStep and the XsYs coordinate system. xStep is information generated by the ADAS 2. xStep can be transmitted from the ADAS 2 to the display device 4.

xStep is used to represent the position of a road marking. The range of xStep is from xStep(MIN) to xStep(MAX). The middle of the range of xStep is xStep(MID). xStep is arranged at equal intervals of width ΔxStep in a direction along the Xs coordinate axis. As an example, the range of xStep may be xStep(0) to xStep(300). In this case, xStep (MID) can be xStep(150). In the case where the range of xStep is from xStep(0) to xStep(300), the width ΔxStep may be, for example, 60.

xStep(MID) is fixed at the position of the vehicle 1 in the direction along the Xs coordinate axis. xStep(MID−q) is the qth (q: an integer of 0 or more) xStep from xStep(MID) in the negative direction of the Xs coordinate axis. xStep (MID+q) is the qth (q: an integer of 0 or more) xStep from xStep(MID) in the positive direction of the Xs coordinate axis.

xStep(MID−q) and xStep(MID+q) are relative to xStep (MID). xStep(MID) is fixed at the position of the vehicle 1 in the direction along the Xs coordinate axis, as mentioned above. Therefore, xStep(MIN) and/or xStep(MAX) may not be displayed on the middle screen 200 depending on the inclination of the road with respect to the position of the vehicle 1. For example, xStep(MIN) is not displayed in FIG. 16 (described later), whereas xStep(MIN) is displayed in FIG. 17 (described later). In the structure illustrated in FIG. 17, the road curves greatly to the right as compared with the structure illustrated in FIG. 16.

[Road Marking Display Process]

A process when the control unit 40 displays each road marking on the middle screen 200 based on information acquired from the ADAS 2 will be described below.

The control unit 40 acquires road condition information from the ADAS 2, by the acquisition unit 10. The road condition information may include the curvature radius R of a road, the type of each road marking, the color of the road marking, the interval of white lines or the like forming the road marking, and information of xStep corresponding to the road marking, as mentioned above. The control unit 40 further acquires an instruction regarding whether to approximate each road marking to a circle or a straight line, from the ADAS 2. The control unit 40 approximates each road marking to a circle or a straight line based on the instruction. The approximation of each road marking to a circle will be described below, with reference to FIG. 8.

Figure 8:
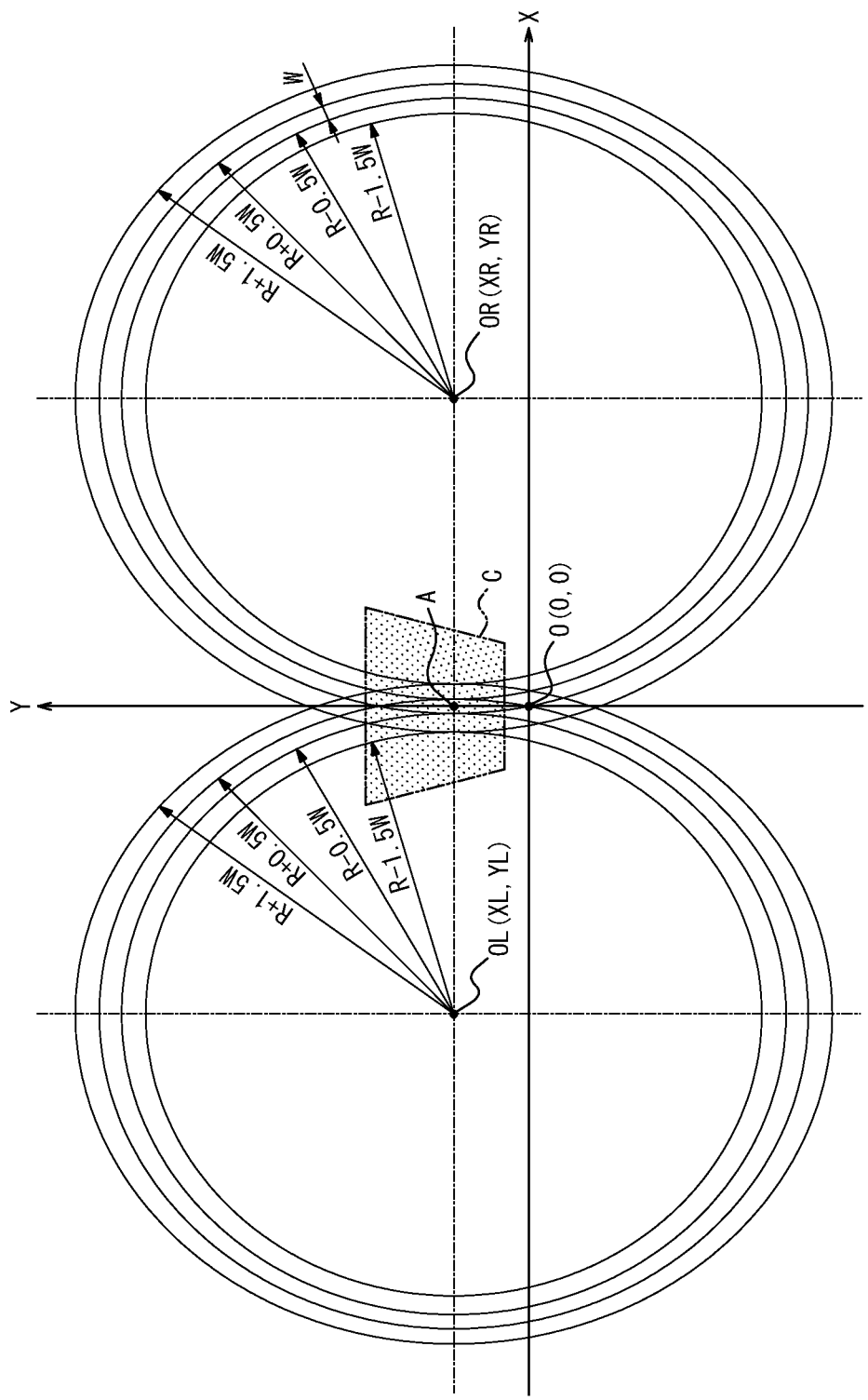
FIG. 8 is a diagram explaining approximation of road markings to circles.

FIG. 8 is a diagram explaining approximation of each road marking to a circle. The structure illustrated in FIG. 8 corresponds to a structure when the XY plane is viewed from above the vehicle 1. The point A indicates the position of the vehicle 1. A range C indicates a range displayable on the middle screen 200. A width W indicates lane width.

The control unit 40 approximates each road marking that curves to the left relative to the traveling direction of the vehicle 1, as a circle with a center OL (XL, YL). The control unit 40 approximates different road markings as circles of different radiuses. For a road marking farther from the vehicle 1, the control unit 40 makes the radius of the circle smaller by the width W corresponding to the road marking.

The control unit 40 approximates each road marking that curves to the right relative to the traveling direction of the vehicle 1, as a circle with a center OR (XR, YR). The control unit 40 approximates different road markings as circles of different radiuses. For a road marking farther from the vehicle 1, the control unit 40 makes the radius of the circle smaller by the width W corresponding to the road marking.

The control unit 40 causes the distance between the center OL (XL, YL) of the left circle and the point A and the distance between the center OR (XR, YR) of the right circle and the point A to be the curvature radius R. The control unit 40 also causes a line connecting the center OL of the left circle and the point A and a line connecting the center OR of the right circle and the point A to be approximately parallel to the X coordinate axis. With such a structure, the X coordinate (XL) of the center OL is a coordinate (−R), and the X coordinate (XR) of the center OR is a coordinate (R). Moreover, the Y coordinate (YL) of the center OL and the Y coordinate (YR) of the center OR each correspond to the distance from the origin O to the point A, i.e. the distance LA illustrated in FIG. 5. That is, the center OL (XL, YL) has coordinates (−R, LA), and the center OR (XR, YR) has coordinates (R, LA).

The control unit 40 may approximate each road marking to a circle by Formula (3):

$$(X-Xi)^2+(Y-Yi)^2=(R+r)^2$$

$$i=L, R \hspace{4cm} \text{Formula (3)}.$$

In Formula (3), a variable (Xi, Yi) is the center coordinates of the circle. When i=L, the variable (Xi, Yi) is the center OL (XL, YL). When i=R, the variable (Xi, Yi) is the center OR (XR, YR). The curvature radius R is the curvature radius R of the road acquired from the ADAS 2. The difference r is set for each xStep. The difference r is the difference between the road marking corresponding to xStep and the curvature radius R of the road.

Figure 9:
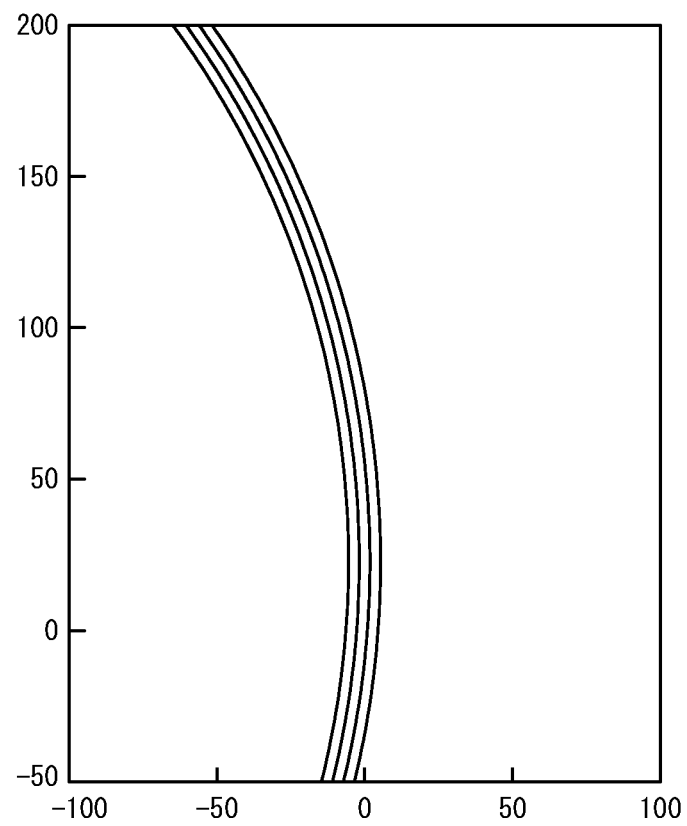
FIG. 9 is a schematic diagram of road markings in an XY plane.

The control unit 40 acquires the X coordinate of each of several points of the road marking from other components in the vehicle 1, by the acquisition unit 10. The control unit 40 substitutes the acquired X coordinate of the road marking into Formula (3). The control unit 40 also acquires the difference r associated with xStep acquired from the ADAS 2, from the storage unit 30. The control unit 40 substitutes the difference r acquired from the storage unit 30 and the curvature radius R of the road acquired from the ADAS 2, into Formula (3). In addition, when i=R, the control unit 40 substitutes the coordinates of the center OR (XR, YR), i.e. (R, LA), into the variable (Xi, Yi). When i=L, the control unit 40 substitutes the coordinates of the center OL (XL, YL), i.e. (−R, LA), into the variable (Xi, Yi). By substituting each value into Formula (3) in this way, the control unit 40 acquires the Y coordinate of the road marking. With such a structure, the control unit 40 acquires the XY coordinates of each road marking on the XY plane, as illustrated in FIG. 9.

In the case of approximating each road marking to a straight line, the control unit 40 may substitute a limiting value (for example, 300000) set as appropriate into the curvature radius R in Formula (3). The limiting value may be set as appropriate based on the driver's vision, the computational load of the control unit 40, and the like.

Figure 10:
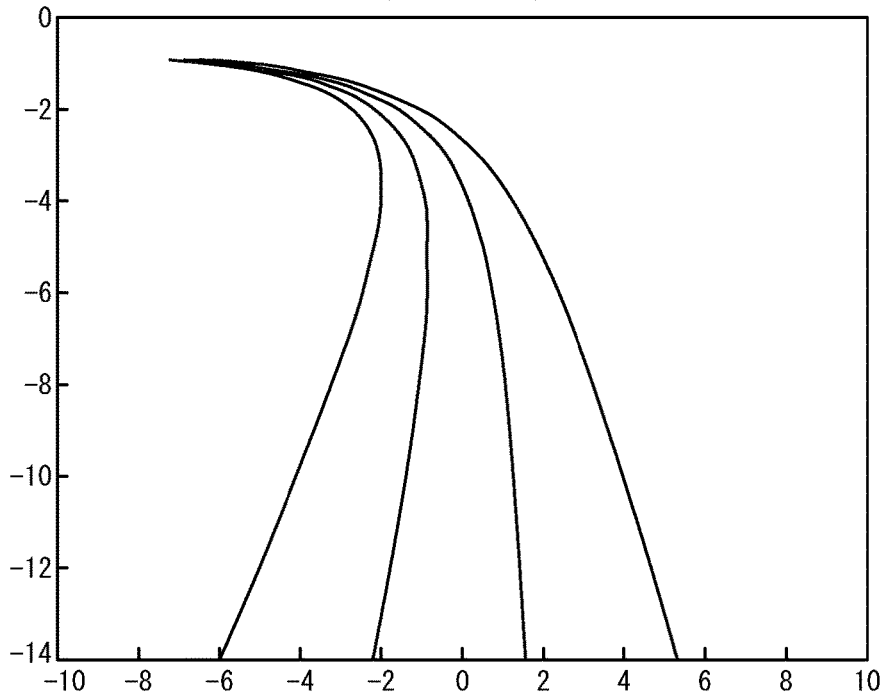
FIG. 10 is a schematic diagram when the road markings illustrated in FIG. 8 are projected onto the virtual screen in a plain view.
Figure 11:
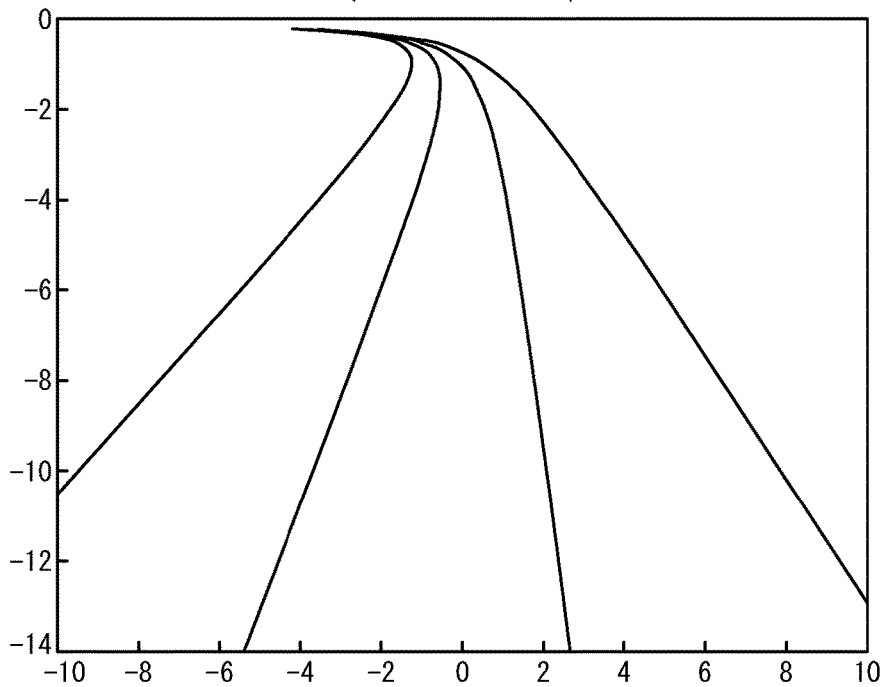
FIG. 11 is a schematic diagram when the road markings illustrated in FIG. 8 are projected onto the virtual screen in a bird's-eye view.
Figure 12:
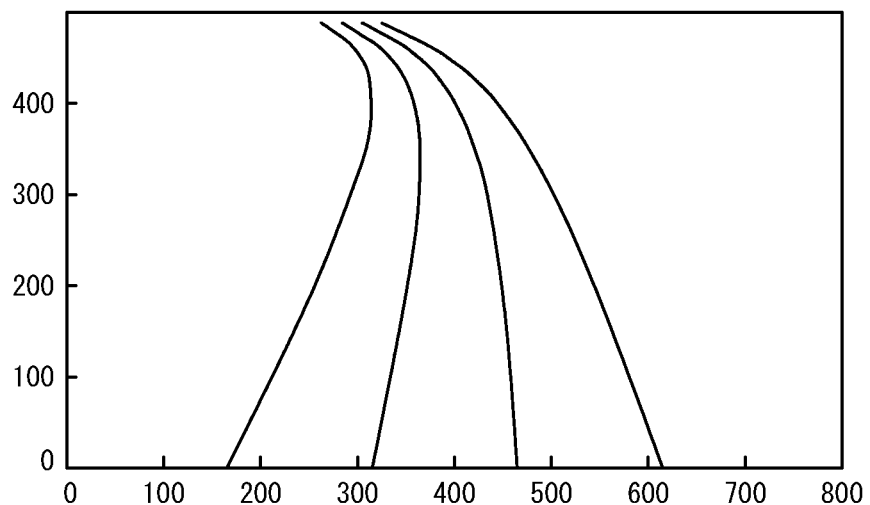
FIG. 12 is a schematic diagram when the schematic diagram of the road markings illustrated in FIG. 10 is displayed on a display unit.
Figure 13:
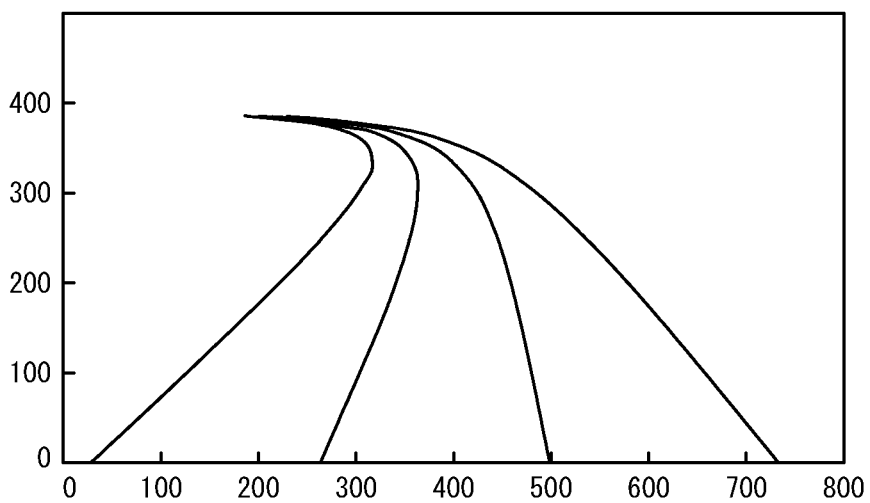
FIG. 13 is a schematic diagram when the schematic diagram of the road markings illustrated in FIG. 11 is displayed on the display unit.
Figure 14:
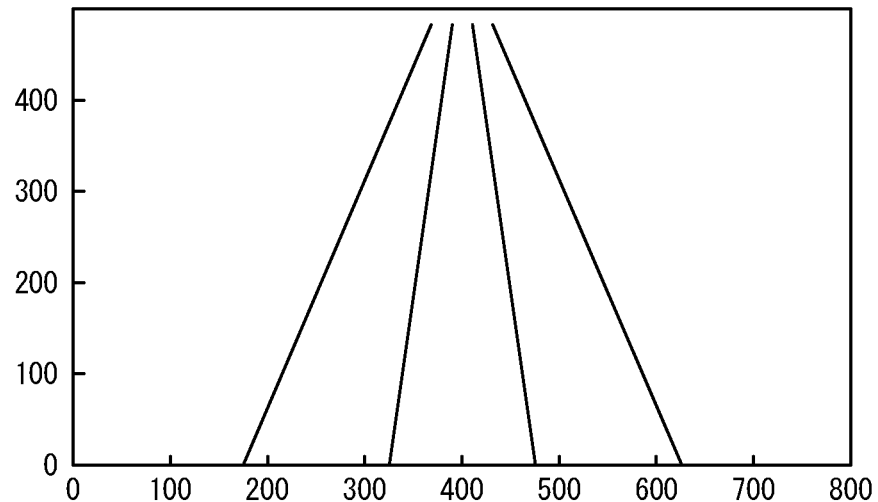
FIG. 14 is a schematic diagram when straight road markings are displayed on the display unit in a plain view.
Figure 15:
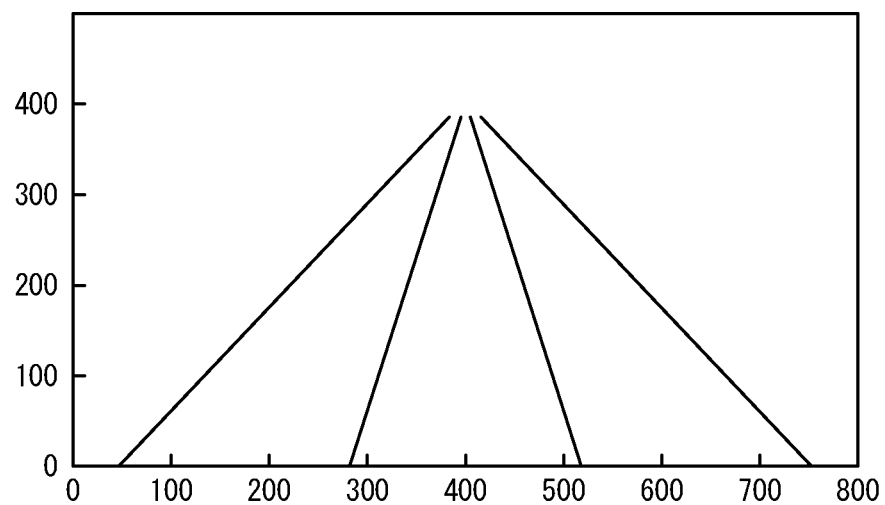
FIG. 15 is a schematic diagram when the straight road markings are displayed on the display unit in a bird's-eye view.

Having acquired the XY coordinates of each road marking, the control unit 40 calculates the coordinates when projecting the XY coordinates of the road marking onto the virtual screen S, by the foregoing Formula (1). For example, when the XY coordinates of each road marking illustrated in FIG. 9 are projected onto the virtual screen S according to the foregoing Formula (1), the coordinates illustrated in FIG. 10 or FIG. 11 are calculated. The control unit 40 further converts the calculated coordinates on the virtual screen S into the XsYs coordinates on the middle screen 200, by the foregoing Formula (2). As a result of the coordinates on the virtual screen S illustrated in FIG. 10 or FIG. 11 being converted according to Formula (2), the road markings illustrated in FIG. 12 or FIG. 13 are calculated. For reference, FIG. 14 and FIG. 15 are each a schematic diagram illustrating road markings on the middle screen 200 as a result of approximation to a straight line.

When displaying each road marking on the middle screen 200, the control unit 40 may display an image of the road marking corresponding to the road marking type and the road marking color acquired from the ADAS 2.

In the case where a road marking is made up of a plurality of lane marks as in the image 220 illustrated in FIG. 3, the control unit 40 may calculate the inclination of each lane mark on the middle screen 200. The control unit 40 may display an image of the lane mark corresponding to the calculated inclination on the middle screen 200. The control unit 40 may calculate the inclination of each lane mark as described in <Process of calculating inclination of other vehicle>below.

[Other Vehicle Display Process]

A process when the control unit 40 displays each object on the middle screen 200 based on information acquired from the ADAS 2 will be described below. It is assumed here that objects are other vehicles.

The control unit 40 acquires information of each object around the vehicle 1 from the ADAS 2, by the acquisition unit 10. The information of each object around the vehicle 1 may include the type (vehicle type) of the other vehicle, xPosition(n) and yPosition(m) corresponding to the other vehicle, and the curvature radius R corresponding to the other vehicle, as mentioned above. When the other vehicle is running on a road, the trajectory of the other vehicle can match the trajectory of the road. Hence, the information of each object around the vehicle 1 may include the curvature radius R of the other vehicle. The information of each object around the vehicle 1 may also include xStep(MID−q) or xStep(MID+q) corresponding to the object.

The control unit 40 calculates the Ys coordinate of the other vehicle, based on yPosition(m) acquired from the ADAS 2. The control unit 40 calculates the Ys coordinate of the other vehicle by Formula (4):

$$Ys=\{(Ys\ MAX-Ys\ MIN)/N\}+YsMIN \qquad \text{Formula (4).}$$

In Formula (4), YsMAX is the Ys coordinate of yPosition (MAX) illustrated in FIG. 6. YsMIN is the Ys coordinate of yPosition(MIN) illustrated in FIG. 6. A variable N is the division number N when dividing the middle screen 200 by the width ΔYs along the Ys coordinate axis illustrated in FIG. 6.

The control unit 40 calculates the Y coordinate of the other vehicle in the XYZ coordinate system, based on the calculated Ys coordinate of the other vehicle. For example, the control unit 40 calculates the Y coordinate of the other vehicle in the XYZ coordinate system by inverse conversion of Formula (2) and Formula (1).

The control unit 40 calculates the X coordinate of the other vehicle in the XYZ coordinate system, based on the calculated Y coordinate of the other vehicle. For example, the control unit 40 acquires the difference r associated with xStep, from the storage unit 30. The control unit 40 applies, to Formula (3), the calculated Y coordinate of the other vehicle in the XYZ coordinate system, the curvature radius R corresponding to the object acquired from the ADAS 2, and the difference r acquired from the storage unit 30, to acquire the X coordinate of the other vehicle.

The control unit 40 calculates the XsYs coordinates of the other vehicle on the middle screen 200, based on the calculated XY coordinates of the other vehicle. For example, the control unit 40 substitutes the calculated XY coordinates of the other vehicle into Formula (1) and Formula (2), to calculate the XsYs coordinates of the other vehicle on the middle screen 200.

<Process of Calculating Inclination of Other Vehicle>

The control unit 40 calculates the inclination of each other vehicle in the XsYs coordinate system of the middle screen 200, based on information according to the display mode of the display unit 20, such as information of xStep. By calculating the inclination of the other vehicle, the control unit 40 can display an image corresponding to the inclination of the other vehicle on the middle screen 200.

Figure 16:
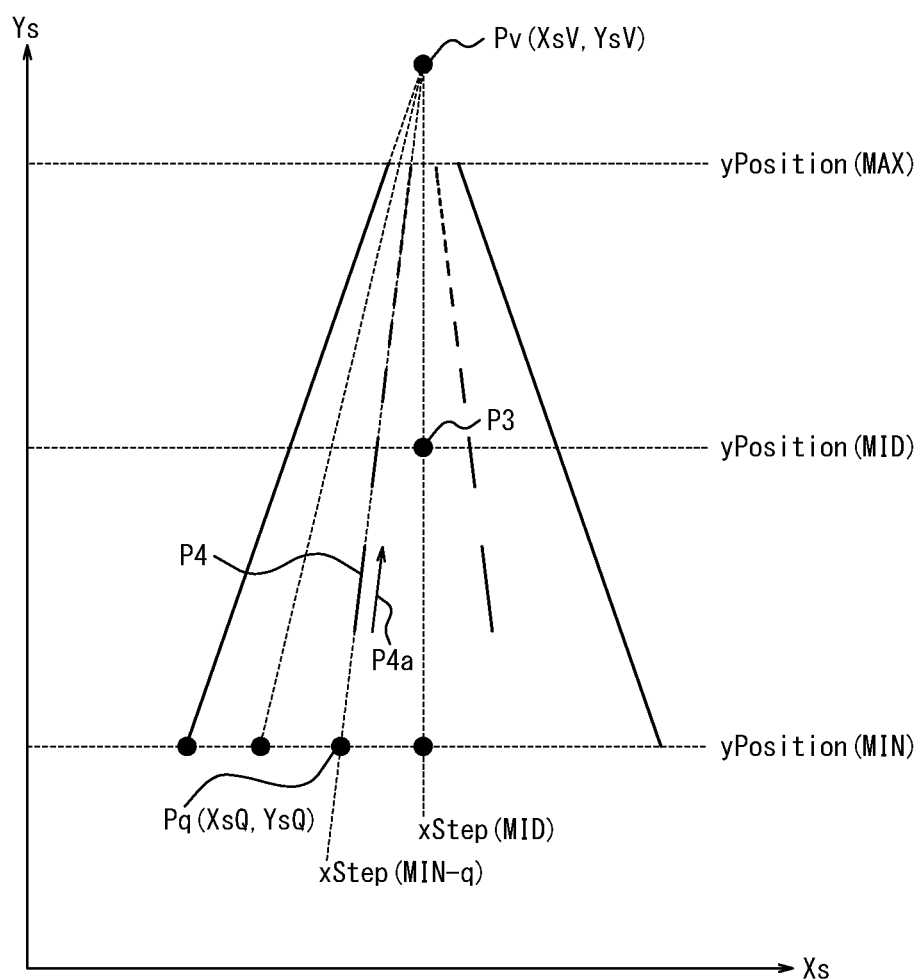
FIG. 16 is a diagram explaining an inclination calculation process.

FIG. 16 is a diagram explaining a process of calculating the inclination of each other vehicle. xStep(MIN) is not displayed in FIG. 16, as mentioned above. An example of calculating the inclination of each lane mark will be described below. A point P4 indicates the position of a lane mark. In the following example, the control unit 40 calculates the inclination of the lane mark corresponding to the point P4 by calculating the inclination of an arrow P4a.

The control unit 40 can acquire xStep(MID−q) corresponding to the point P4, from the ADAS 2. In an image displayed in perspective, lane marks arranged in the traveling direction of the vehicle 1 converge to the vanishing point Pv. In view of this, the control unit 40 calculates the inclination of the lane mark corresponding to the point P4, by calculating a formula of a straight line passing through a point Pq and the vanishing point Pv. The point Pq is the position of xStep(MID−q) on yPosition(MIN). The formula of the straight line passing through the point Pq and the vanishing point Pv is, for example, given by Formula (5). In this case, the control unit 40 calculates an inclination α in Formula (5) as the inclination of the lane mark corresponding to the point P4:

$$Ys=\alpha Xs+\beta \qquad (5).$$

In Formula (5), the inclination α is the inclination of the straight line passing through the point Pq and the vanishing point Pv. An intercept β is an intercept of the straight line passing through the point Pq and the vanishing point Pv in the XsYs coordinate system.

A method of acquiring the XsYs coordinates (XsQ, YsQ) of the point Pq will be described below. xStep is arranged with the width ΔxStep in the direction along the Xs coordinate axis, as mentioned above. Hence, the control unit 40 calculates the width ΔxStep on yPosition(MIN) in units of Xs coordinate. The control unit 40 calculates the Xs coordinate (XsQ) of the point Pq from the width ΔxStep calculated in units of Xs coordinate.

Figure 17:
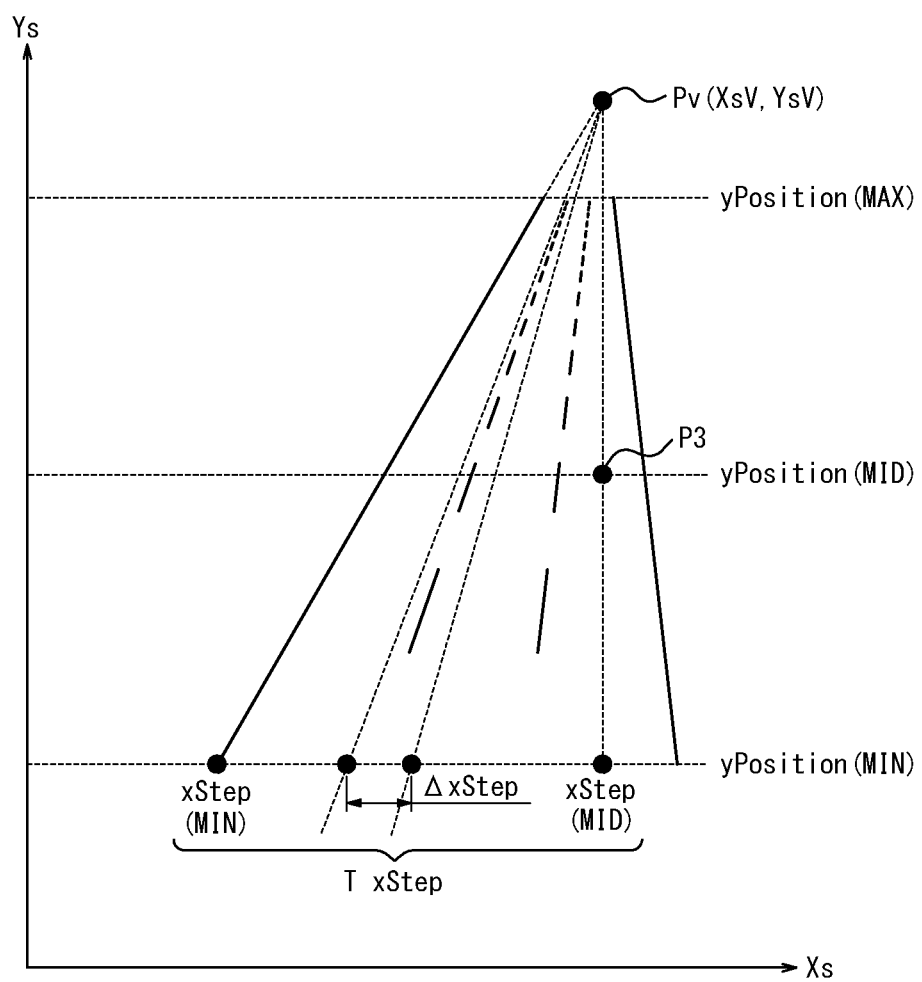
FIG. 17 is a diagram explaining calculation of coordinates of xStep.

FIG. 17 is a diagram explaining calculation of coordinates of xStep. xStep(MIN) is displayed in FIG. 17, as mentioned above. In the structure illustrated in FIG. 17, the number of xStep from xStep(MIN) to xStep(MID) is T. The control unit 40 acquires the Xs coordinate of xStep(MID) on yPosition (MIN) and the Xs coordinate of xStep(MIN) on yPosition (MIN). The control unit 40 subtracts the Xs coordinate of xStep(MIN) from the Xs coordinate of xStep(MID), and divides the subtraction result by T, thus calculating the width ΔxStep on yPosition(MIN) in units of Xs coordinate.

The control unit 40 calculates the Xs coordinate of the point Pq, based on the calculated width ΔxStep in units of Xs coordinate. The control unit 40 also acquires the Ys coordinate of yPosition(MIN) as the Ys coordinate of the point Pq. With such a structure, the control unit 40 acquires the XsYs coordinates (XsQ, YsQ) of the point Pq.

The control unit 40 calculates the inclination a in Formula (5), using the XsYs coordinates (XsQ, YsQ) of the point Pq and the XsYs coordinates (XsV, YsV) of the vanishing point Pv. The XsYs coordinates (XsV, YsV) of the vanishing point Pv can depend on whether the display mode of the middle screen 200 is a bird's-eye view or a plain view. The control unit 40 calculates the inclination α and the intercept β by Formula (6):

$$\alpha = (YsV - YsQ)/(XsV - XsQ)$$

$$\beta = YsQ - \alpha \times XsQ \qquad \text{Formula (6)}.$$

The control unit 40 takes the calculated inclination a to be the inclination of the other vehicle. The control unit 40 selects an image corresponding to the calculated inclination α from the images stored in the storage unit 30. For example, the storage unit 30 stores a finite number of images corresponding to inclinations. In this case, the control unit 40 selects an image corresponding to an inclination closest to the calculated inclination a, from the finite number of images stored in the storage unit 30.

Here, the road may be curved. In this case, the control unit 40 may calculate the inclination αm of a straight line passing through a point qm of xStep(MID−q) on yPosition(m) and the vanishing point Pv. The control unit 40 may also calculate the inclination αm⁻ of a straight line passing through a point qm⁻ of xStep(MID−q) on yPosition(m−1) and the vanishing point Pv. The control unit 40 may further calculate the inclination αm⁺ of a straight line passing through a point qm⁺ f xStep(MID−q) on yPosition(m+1) and the vanishing point Pv. In addition, the control unit 40 may calculate a minimum value α min and a maximum value α max from the inclination αm⁻, the inclination αm, and the inclination αm⁺ by Formula (7):

$$\alpha \min = (\alpha m^- + \alpha m)/2$$

$$\alpha \max = (\alpha m^+ + \alpha m)/2 \qquad \text{Formula (7)}.$$

The control unit 40 may select as appropriate an image relating to an inclination in the range from the minimum value α min to the maximum value α max, from the finite number of images stored in the storage unit 30.

<Scaling Ratio Calculation Process>

The control unit 40 calculates the scaling ratio of the image of each other vehicle when displaying the image on the middle screen 200. The control unit 40 calculates the scaling ratio of the image of each other vehicle, based on information according to the display mode of the display unit 20, such as information of yPosition. The control unit 40 calculates the scaling ratio of the other vehicle relative to the image of the vehicle 1 (the image 240 illustrated in FIG. 3).

Figure 18:
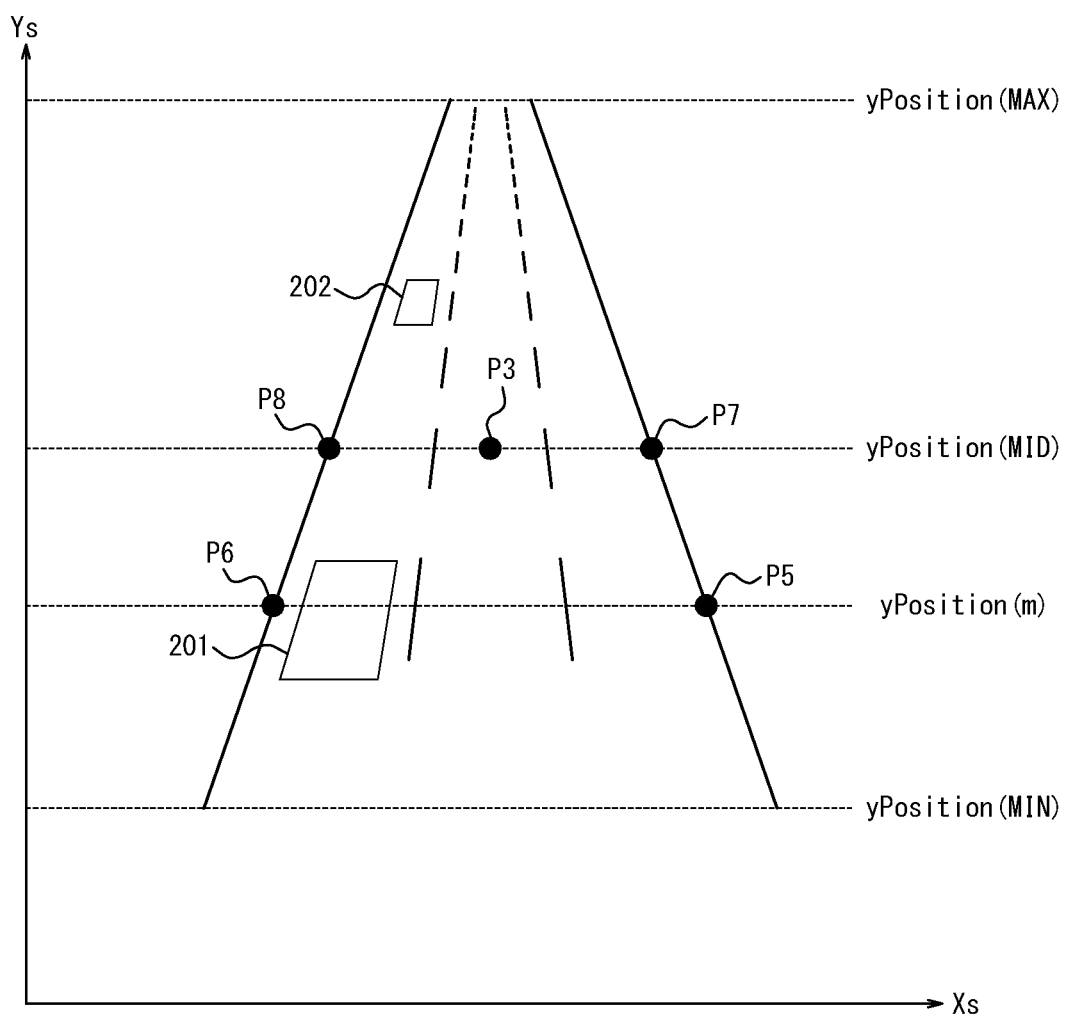
FIG. 18 is a diagram explaining a scaling ratio calculation process.

FIG. 18 is a diagram explaining a scaling ratio calculation process. The point P3 indicating the position of the vehicle 1 is located on yPosition(MID), as mentioned above. A region 201 indicates an image region of another vehicle enlarged. A region 202 indicates an image region of another vehicle reduced. By calculating the scaling ratio, an enlarged or reduced image of each other vehicle can be displayed on the middle screen 200.

The control unit 40 can acquire yPosition(m) corresponding to each other vehicle, from the ADAS 2. The control unit 40 calculates the scaling ratio of the image of the other vehicle, by dividing the length of the image of the road on yPosition(m) along the Xs coordinate axis by the length of the image of the road on yPosition(MID) along the Xs coordinate axis. The control unit 40 may calculate the scaling ratio γ of the image by Formula (8):

$$\gamma = (Xs5 - Xs6)/(Xs7 - Xs8) \qquad \text{Formula (8)}.$$

In Formula (8), a variable Xs5 is the Xs coordinate of a point P5. The point P5 indicates the position of the road on the most positive side of the Xs coordinate axis, on yPosition (m). A variable Xs6 is the Xs coordinate of a point P6. The point P6 indicates the position of the road on the most negative side of the Xs coordinate axis, on yPosition(m). A variable Xs7 is the Xs coordinate of a point P7. The point P7 indicates the position of the road on the most positive side of the Xs coordinate axis, on yPosition(MID). A variable Xs8 is the Xs coordinate of a point P8. The point P8 indicates the position of the road on the most negative side of the Xs coordinate axis, on yPosition(MID).

[Road Marking Display Operation]

Figure 19:
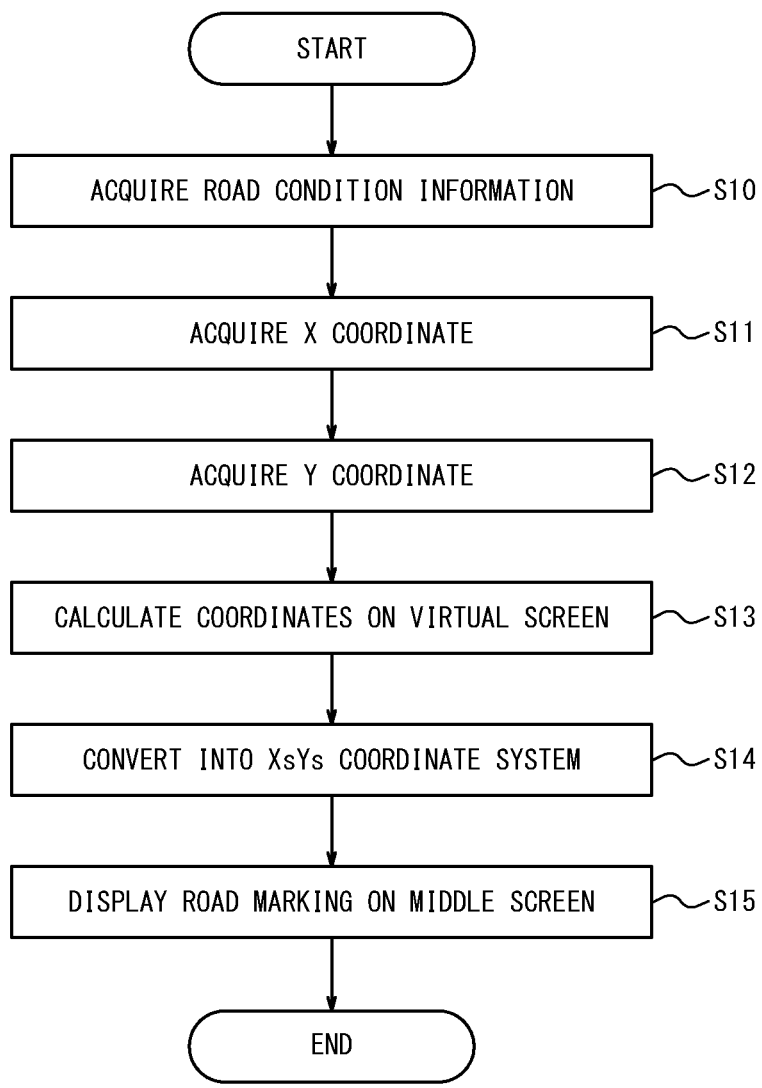
FIG. 19 is a flowchart illustrating an example of operation of a road marking display procedure by a display device.

FIG. 19 is a flowchart illustrating an example of operation of a road marking display procedure by the display device 4. The control unit 40 may start the process illustrated in FIG. 19 according to the timing of communication with the ADAS 2 as appropriate.

In step S10, the control unit 40 acquires road condition information from the ADAS 2, by the acquisition unit 10. The road condition information may include the curvature radius R of a road, the type of each road marking, the color of the road marking, the interval of white lines or the like forming the road marking, and information of xStep corresponding to the road marking, as mentioned above. In step S10, the control unit 40 further acquires an instruction regarding whether to approximate each road marking to a circle or a straight line, from the ADAS 2.

In step S11, the control unit 40 acquires the X coordinate of each of several points of the road marking from other components in the vehicle 1, by the acquisition unit 10.

In step S12, the control unit 40 acquires the Y coordinate of the road marking based on the road condition information acquired in step S10 and the X coordinate of the road marking acquired in step S11.

For example, suppose the control unit 40 acquires an instruction to approximate each road marking to a circle in step S10. In this case, in step S12, the control unit 40 acquires the difference r associated with xStep from the storage unit 30. The control unit 40 applies the X coordinate acquired in step S11, the curvature radius R of the road, and the difference r to the foregoing Formula (3), to calculate the Y coordinate of the road marking.

For example, suppose the control unit 40 acquires an instruction to approximate each road marking to a straight line in step S10. In this case, in step S12, the control unit 40 substitutes a limiting value (for example, 300000) set as appropriate into the curvature radius R in Formula (3).

In step S13, the control unit 40 converts the XY coordinates of the road marking into the coordinates on the virtual screen S by the foregoing Formula (1).

In step S14, the control unit 40 converts the coordinates converted in step S13 into the XsYs coordinates on the middle screen 200 by the foregoing Formula (2).

In step S15, the control unit 40 displays the road marking on the middle screen 200, based on the XsYs coordinates of the road marking acquired in step S14. In step S15, the control unit 40 may display an image of the road marking corresponding to the road marking type and the road marking color acquired in step S10.

In the case where a road marking is made up of a plurality of lane marks, the control unit 40 may calculate the inclination of each lane mark on the middle screen 200. In this case, the control unit 40 may calculate the inclination of each lane mark, by performing the process of step S25 illustrated in FIG. 20 during the process of steps S11 to S15. The control unit 40 may display an image of the lane mark corresponding to the inclination on the middle screen 200 in step S15.

[Other Vehicle Display Operation]

Figure 20:
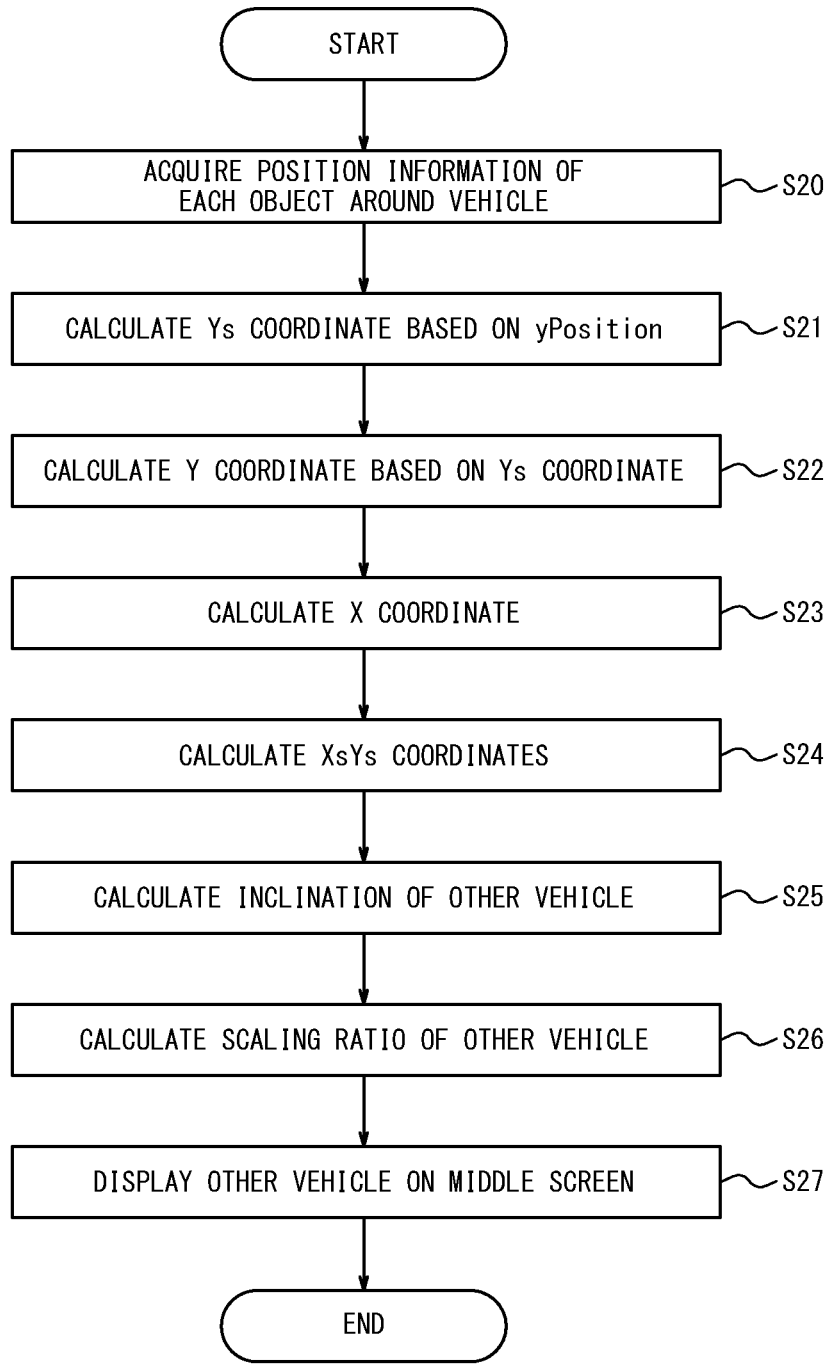
FIG. 20 is a flowchart illustrating an example of operation of an other vehicle display procedure by the display device.

FIG. 20 is a flowchart illustrating an example of operation of an other vehicle display procedure by the display device 4. The control unit 40 may start the process illustrated in FIG. 20 according to the timing of communication with the ADAS 2 as appropriate. The control unit 40 may perform the process illustrated in FIG. 20 concurrently with the process illustrated in FIG. 19.

In step S20, the control unit 40 acquires information of each object around the vehicle 1 from the ADAS 2, by the acquisition unit 10. The information of each object around the vehicle 1 may include the type (vehicle type) of each other vehicle, xPosition(n) and yPosition(m) corresponding to the other vehicle, and the curvature radius R corresponding to the other vehicle, as mentioned above.

In step S21, the control unit 40 calculates the Ys coordinate of each other vehicle, based on yPosition(m) acquired from the ADAS 2. For example, the control unit 40 calculates the Ys coordinate of the other vehicle by the foregoing Formula (4).

In step S22, the control unit 40 calculates the Y coordinate of the other vehicle in the XYZ coordinate system, based on the Ys coordinate of the other vehicle calculated in step S21. For example, the control unit 40 calculates the Y coordinate of the other vehicle in the XYZ coordinate system by inverse conversion of the foregoing Formula (2) and Formula (1).

In step S23, the control unit 40 calculates the X coordinate of the other vehicle in the XYZ coordinate system, based on the Y coordinate of the other vehicle calculated in step S22. For example, the control unit 40 acquires the difference r associated with xStep from the storage unit 30. The control unit 40 applies, to Formula (3), the calculated Y coordinate of the other vehicle in the XYZ coordinate system, the curvature radius R corresponding to the object acquired from the ADAS 2, and the difference r acquired from the storage unit 30, to acquire the X coordinate of the other vehicle.

In step S24, the control unit 40 calculates the XsYs coordinates of the other vehicle in the XsYs coordinate system of the middle screen 200, based on the XY coordinates of the other vehicle calculated in steps S22 and S23. For example, the control unit 40 substitutes the XY coordinates of the other vehicle into the foregoing Formula (1) and Formula (2), to calculate the XsYs coordinates of the other vehicle in the XsYs coordinate system of the middle screen 200.

In step S25, the control unit 40 calculates the inclination of the other vehicle in the XsYs coordinate system of the middle screen 200.

In step S26, the control unit 40 calculates the scaling ratio of an image of the other vehicle when displaying the image on the middle screen 200.

In step S27, the control unit 40 displays the image of the other vehicle on the middle screen 200. For example, the control unit 40 selects an image corresponding to the vehicle type acquired in step S20 and the inclination calculated in step S25, from the storage unit 30. The control unit 40 scales the image selected from the storage unit 30, according to the scaling ratio calculated in step S26. The control unit 40 displays the scaled image on the middle screen 200.

As described above, in the display device 4 according to this embodiment, the control unit 40 calculates the coordinates of the second point P2 obtained as a result of projecting the first point P1 of an object in the XYZ coordinate system onto the virtual screen S, as illustrated in FIG. 4. The control unit 40 further converts the calculated coordinates of the second point P2 into the XsYs coordinate system according to the display unit 20, and displays the result on the middle screen 200. With such a structure, this embodiment can provide the display device 4 and the display method that can display objects such as other vehicles in a perspective view more easily.

Although one of the disclosed embodiments has been described by way of the drawings and examples, various changes and modifications may be easily made by those of ordinary skill in the art based on the present disclosure. Such changes and modifications are therefore included in the scope of the present disclosure. For example, the functions included in the means may be rearranged without logical inconsistency, and a plurality of means may be combined into one means and a means may be divided into a plurality of means.

For example, although the foregoing embodiment describes an example in which the control unit 40 displays, on the middle screen 200 in the display unit 20, objects such as other vehicles present on a road, the objects that can be displayed on the middle screen 200 in the display unit 20 are not limited to objects present on a road. The display device 4 may display objects flying above a road, such as aircrafts. An example of this structure will be described below, with reference to FIG. 21.

Figure 21:
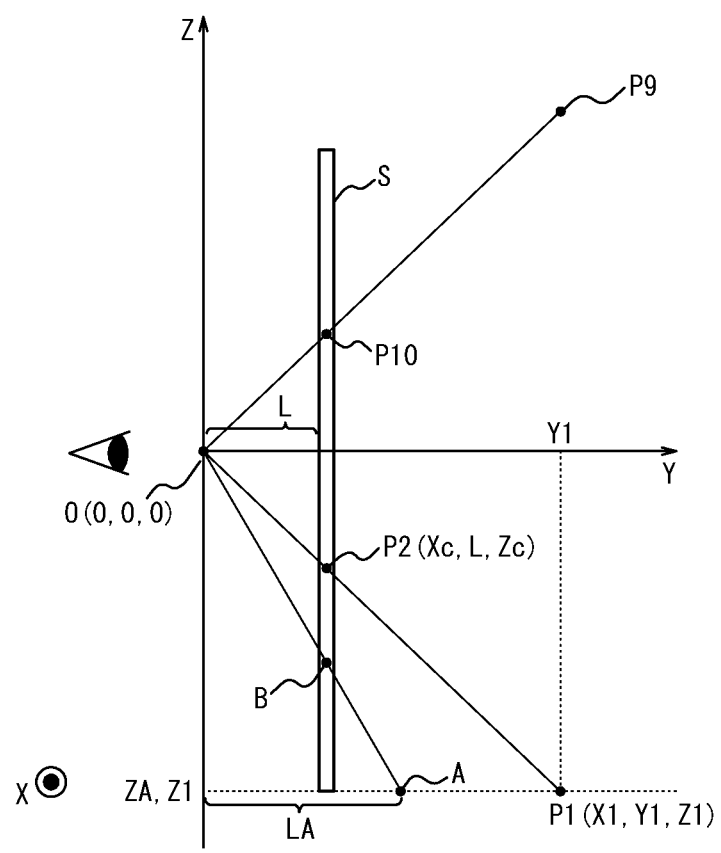
FIG. 21 is a diagram explaining an application of the display device.

FIG. 21 is a diagram explaining an application of the display device 4. A first point P9 indicates the position of an aircraft. A second point P10 is a point at which the first point P9 is projected onto the virtual screen S when the first point P9 is viewed from the origin O of the XYZ coordinate system.

The control unit 40 can calculate the X coordinate and the Z coordinate of the second point P2, by substituting the XYZ coordinates of the first point P9 into (X, Y, Z) in the foregoing Formula (1). The control unit 40 can convert the X coordinate and the Z coordinate of the second point P2 into the XsYz coordinates on the middle screen 200, by the foregoing Formula (2). With such a structure, the display device 4 can display the aircraft corresponding to the first point P9 on the middle screen 200.

REFERENCE SIGNS LIST 1 vehicle
2 ADAS
3 car navigation system
4 display device
5 communication bus
10 acquisition unit
20 display unit
21 meter display
30 storage unit
40 control unit
100 display screen
101 tachometer
102 speedometer
110 upper screen
120 lower screen
200 middle screen
201, 202 region
210, 220, 230, 240 image

The invention claimed is:

1. A display device mounted on a vehicle and comprising a control unit and a display unit,
wherein the control unit is configured to calculate coordinates of a second point obtained as a result of projecting a first point in a three-dimensional coordinate system onto a two-dimensional plane, convert the calculated coordinates of the second point into coordinates according to a display mode of the display unit, and cause the display unit to display an image corresponding to the second point at the converted coordinates,
the three-dimensional coordinate system is a three-dimensional coordinate system relative to the vehicle, and is defined by an X coordinate axis approximately parallel to a width direction of the vehicle, a Y coordinate axis approximately parallel to a direction from rear to front of the vehicle, and a Z coordinate axis approximately parallel to a height direction of the vehicle,
the two-dimensional plane is at a predetermined distance away from an origin of the three-dimensional coordinate system along the Y coordinate axis, and is approximately parallel to an XZ plane defined by the X coordinate axis and the Z coordinate axis, and
the control unit is configured to:
calculate the coordinates of the second point obtained as a result of projecting the first point in the three-dimensional coordinate system onto the two-dimensional plane, by the following Formula (1):

$$Xc=(L/Y)\times X$$
$$Zc=(L/Y)\times Z \quad \text{Formula (1)},$$

where the predetermined distance is L, coordinates of the first point in the three-dimensional coordinate system are (X, Y, Z), and the coordinates of the second point on the two-dimensional plane are (Xc, Zc); and
convert the calculated coordinates of the second point into the coordinates according to the display unit, by the following Formula (2):

$$Xs=Xc\times(C1/ZA)+C2$$
$$Ys=Zc\times(C1/ZA)+C1 \quad \text{Formula (2)},$$

where a coordinate system of the display unit is an XsYs coordinate system, a Z coordinate of the vehicle in the three-dimensional coordinate system is ZA, and the display mode of the display unit varies depending on a constant C1 and a constant C2.

2. The display device according to claim 1, wherein the XsYs coordinate system of the display unit is a two-dimensional coordinate system defined by an Xs coordinate axis corresponding to the width direction of the vehicle and a Ys coordinate axis orthogonal to the Xs coordinate axis, and
the control unit is configured to convert the calculated coordinates of the second point into XsYs coordinates in the XsYs coordinate system.

3. The display device according to claim 1, wherein the origin of the three-dimensional coordinate system is set at a position behind and away from the vehicle.

4. The display device according to claim 3, wherein the two-dimensional plane is set at a position between the origin of the three-dimensional coordinate system and a rear part of the vehicle.

5. The display device according to claim 1, wherein the control unit is configured to calculate an inclination of the image corresponding to the second point, based on information according to the display mode of the display unit.

6. The display device according to claim 1, wherein the control unit is configured to calculate a scaling ratio of the image corresponding to the second point, based on information according to the display mode of the display unit.

7. A display method in a display device mounted on a vehicle, the display method comprising:
calculating coordinates of a second point obtained as a result of projecting a first point in a three-dimensional coordinate system onto a two-dimensional plane, converting the calculated coordinates of the second point into coordinates according to a display mode of the display device, and displaying an image corresponding to the second point at the converted coordinates,
wherein the three-dimensional coordinate system is a three-dimensional coordinate system relative to the vehicle, and is defined by an X coordinate axis approximately parallel to a width direction of the vehicle, a Y coordinate axis approximately parallel to a direction from rear to front of the vehicle, and a Z coordinate axis approximately parallel to a height direction of the vehicle,
the two-dimensional plane is at a predetermined distance away from an origin of the three-dimensional coordinate system along the Y coordinate axis, and is approximately parallel to an XZ plane defined by the X coordinate axis and the Z coordinate axis, the method further comprising
calculating the coordinates of the second point obtained as a result of projecting the first point in the three-dimensional coordinate system onto the two-dimensional plane, by the following Formula (1):

$$Xc=(L/Y)\times X$$
$$Zc=(L/Y)\times Z \quad \text{Formula (1)},$$

where the predetermined distance is L, coordinates of the first point in the three-dimensional coordinate system are (X, Y, Z), and the coordinates of the second point on the two-dimensional plane are (Xc, Zc); and
of converting the calculated coordinates of the second point into the coordinates according to a display unit in the display device, by the following Formula (2):

$$Xs=Xc\times(C1/ZA)+C2$$
$$Ys=Zc\times(C1/ZA)+C1 \quad \text{Formula (2)},$$

where a coordinate system of the display unit is an XsYs coordinate system, a Z coordinate of the vehicle in the three-dimensional coordinate system is ZA, and the display mode of the display unit varies depending on a constant C1 and a constant C2.

\* \* \* \* \*